US011390470B1

(12) United States Patent
Cooley

(10) Patent No.: US 11,390,470 B1
(45) Date of Patent: Jul. 19, 2022

(54) CLEAN ENERGY INTEGRATED TRANSPORTATION SYSTEM

(71) Applicant: Cooley Enterprises, LLC, Houston, TX (US)

(72) Inventor: Maryam Cooley, Houston, TX (US)

(73) Assignee: Cooley Enterprises, LLC, Houston, TX (US)

( * ) Notice: Subject to any disclaimer, the term of this patent is extended or adjusted under 35 U.S.C. 154(b) by 0 days.

(21) Appl. No.: 17/540,054

(22) Filed: Dec. 1, 2021

(51) Int. Cl.
| | |
|---|---|
| *B65G 35/06* | (2006.01) |
| *B65G 51/04* | (2006.01) |
| *B61B 9/00* | (2006.01) |
| *B65G 51/08* | (2006.01) |
| *B60F 5/00* | (2006.01) |
| *B65G 51/26* | (2006.01) |

(52) U.S. Cl.
CPC ............... *B65G 51/04* (2013.01); *B60F 5/00* (2013.01); *B61B 9/00* (2013.01); *B65G 51/08* (2013.01); *B65G 51/26* (2013.01)

(58) Field of Classification Search
CPC .................................. B65G 35/06; B61B 9/00
See application file for complete search history.

(56) References Cited

U.S. PATENT DOCUMENTS

| | | | |
|---|---|---|---|
| 3,612,438 A | 10/1971 | Herndon | |
| 3,859,926 A * | 1/1975 | Strohschein | .............. B61B 7/06 |
| | | | 104/178 |
| 3,870,250 A | 3/1975 | Teodorescu et al. | |
| 3,875,868 A * | 4/1975 | Martin, Jr. | .............. B61F 13/00 |
| | | | 104/244 |

(Continued)

FOREIGN PATENT DOCUMENTS

| | | |
|---|---|---|
| CN | 105015558 A | 11/2015 |
| CN | 108688686 A | 10/2018 |

(Continued)

OTHER PUBLICATIONS

Hodson, Noel, "Pneumatic Transportk—State of the Art: Foodtubes," http://www.noelhodson.com/index_files/StateoftheArt-foodtubes2FEB07.htm, May 16, 2007, 25 Pages.

(Continued)

*Primary Examiner* — Joseph A Dillon, Jr.
(74) *Attorney, Agent, or Firm* — Baker Botts L.L.P.

(57) ABSTRACT

A system for transporting one or more items is provided. The system includes: a transportation tube disposed at least partially underground or at least partially above ground; a transportation pod to secure items therein for transport; a transportation actuator to propel the transportation pod through the transportation tube, the transportation actuator including at least one cable configured to interface with the transportation pod, the at least one cable being driven by a motor to move the cable and the transportation pod through the transportation tube; a first access point located proximate a first end of the transportation tube; and a second access point located proximate a second end of the transportation tube. Each of the first and second access points includes an opening configured to allow the transportation pod to be received into or removed from the transportation tube.

30 Claims, 14 Drawing Sheets

(56) References Cited

U.S. PATENT DOCUMENTS

| | | | | |
|---|---|---|---|---|
| 3,881,423 | A * | 5/1975 | Woods | B61B 9/00 104/18 |
| 4,308,945 | A * | 1/1982 | Beckmann | B21B 39/004 104/173.1 |
| 4,347,791 | A | 9/1982 | Mandros | |
| 4,820,086 | A | 4/1989 | Kieronski | |
| 5,237,931 | A * | 8/1993 | Riedl | B61B 3/00 104/173.1 |
| 5,361,706 | A * | 11/1994 | Kunczynski | B61B 12/024 188/312 |
| 5,419,261 | A * | 5/1995 | Tarassoff | B61B 9/00 104/178 |
| 5,526,754 | A * | 6/1996 | Kunczynski | B61B 12/02 198/810.04 |
| 5,950,543 | A | 9/1999 | Oster | |
| 6,374,746 | B1 | 4/2002 | Fiske | |
| 6,450,103 | B2 | 9/2002 | Svensson | |
| 7,255,220 | B2 * | 8/2007 | Iwai | B65G 35/08 198/465.4 |
| 8,006,625 | B2 | 8/2011 | Yang | |
| 8,116,906 | B2 | 2/2012 | Valerino, Sr. | |
| 8,468,949 | B2 * | 6/2013 | Kwon | B61B 13/08 104/155 |
| 8,720,345 | B1 * | 5/2014 | English | B61D 15/12 105/147 |
| 8,915,192 | B2 * | 12/2014 | Zhou | B61B 13/08 104/138.1 |
| 9,114,937 | B2 * | 8/2015 | Ecob | B65G 17/00 |
| 9,463,811 | B2 * | 10/2016 | Bavaresco | B61B 9/00 |
| 9,517,901 | B2 * | 12/2016 | Bambrogan | B60L 13/03 |
| 9,533,830 | B2 * | 1/2017 | Lingenhoel | B65G 35/06 |
| 10,081,374 | B2 * | 9/2018 | Allaire | E01B 25/08 |
| 10,087,007 | B2 * | 10/2018 | Ishibashi | B65G 17/123 |
| 10,286,925 | B2 * | 5/2019 | Evans | B61B 13/00 |
| 10,354,476 | B2 * | 7/2019 | Jones | G07F 11/16 |
| 10,518,979 | B2 * | 12/2019 | Takeuchi | B61B 12/007 |
| 10,640,354 | B2 * | 5/2020 | Burkhard | B67C 7/002 |
| 10,836,406 | B2 * | 11/2020 | Lum | B61B 13/08 |
| 10,864,924 | B2 * | 12/2020 | Richard | B61B 13/125 |
| 10,994,941 | B1 * | 5/2021 | Dwivedi | B65G 35/06 |
| 11,014,580 | B2 * | 5/2021 | Stubler | B61B 9/00 |
| 11,014,667 | B2 * | 5/2021 | Lery | G08B 25/016 |
| 11,066,248 | B2 * | 7/2021 | Abe | H01L 21/67727 |
| 11,097,750 | B2 * | 8/2021 | Conte | B61B 9/00 |
| 11,192,724 | B2 * | 12/2021 | Miao | E21F 15/06 |
| 11,299,352 | B2 * | 4/2022 | Choe | B65G 17/005 |
| 2004/0244633 | A1 | 12/2004 | Witmer | |
| 2010/0186618 | A1 | 7/2010 | King et al. | |
| 2011/0076104 | A1 * | 3/2011 | Ersoy | B65G 51/24 406/34 |
| 2013/0319822 | A1 * | 12/2013 | Robbin | B05B 13/0264 198/602 |
| 2015/0000547 | A1 * | 1/2015 | Bavaresco | B61B 12/10 104/165 |
| 2018/0086353 | A1 * | 3/2018 | Holbrooke | B61D 3/18 |
| 2019/0176850 | A1 * | 6/2019 | Tashiro | B62D 65/18 |
| 2020/0128990 | A1 * | 4/2020 | Pate | A47G 29/1209 |
| 2021/0155421 | A1 * | 5/2021 | Koga | B65G 54/02 |
| 2022/0106136 | A1 * | 4/2022 | Bambrogan | B65G 67/603 |

FOREIGN PATENT DOCUMENTS

| | | |
|---|---|---|
| CN | 111591767 A | 8/2020 |
| DE | 2213210 A1 | 10/1973 |
| GB | 2332658 A1 | 6/1999 |
| JP | 2004099311 A | 4/2004 |
| KR | 20120066235 A | 6/2012 |
| KR | 20160120531 A | 10/2016 |
| WO | 2011/078762 A1 | 6/2011 |
| WO | 2015/027339 A1 | 3/2015 |
| WO | 2019/190346 A1 | 10/2019 |

OTHER PUBLICATIONS

Ralbovsky, Frank et al., "Feasibility of Underground Pneumatic Freight Transport in New York City", https://cuire.uta.edu/UPFT%20NY.pdf, Aug. 1, 2004, 99 Pages.

Kelesovska, Monika, "Will Hyperloop Bring Changes in the Freight Transport?", https://www.eurosender.com/blog/en/hyperloop-freight/. Aug. 21, 2020, 4 Pages.

Werner, Max et al., "Shared Value Potential of Transporting Cargo via Hyperloop", Frontiers in Built Environment, https://www.frontiersin.org/articles/10.3389/fbuil.2016.00017/full, Aug. 2, 2016, 11 Pages.

* cited by examiner

CLEAN ENERGY INTEGRATED TRANSPORTATION SYSTEM

TECHNICAL FIELD

Embodiments of the present disclosure relate to transportation systems and, more particularly, to a clean energy integrated transportation system used to transport goods between multiple locations.

BACKGROUND

As the world and our nation looks to confront climate change to avoid irreversible impacts of global warming and continued impacts of more severe weather changes, new disruptive innovation and technologies are needed to transition away from the largest contributor of greenhouse gas emissions, which is by far the Transportation Sector. Conventionally, transportation of goods over long and short distances require the use and coordination of multiple different vehicle types, the vast majority of which release large amounts of carbon into the environment. For example, mail delivery often relies on planes and/or large trucks to provide interstate transportation, followed by smaller mail delivery vehicles once in a destination city. Due to an increased eCommerce demand for faster delivery of purchased goods (e.g., two-day, one-day, or even same-day delivery) and food delivery services, particularly in urban and suburban regions with large population densities, an increasing number of vehicles are present on the roadways, railways, and airways.

The current transportation systems contribute to a wide range of complex problems related to global warming, environmental degradation, human health implications, and large continued emissions of greenhouse gases. Compounding these problems, natural disasters and other extreme weather events are becoming more commonplace due to climate change. These weather events impede the fast and reliable delivery of goods to people in affected areas, including those in need of emergency supplies like clean drinking water and medicine.

It is now recognized that a need exists for disruptive innovations that offer to build greater eco-friendly transportation resilience for fast, reliable, efficient and net carbon neutral methods for transporting items over distances both large and small.

SUMMARY

In accordance with an aspect of the present disclosure, a system for transporting one or more items includes a transportation tube disposed at least partially underground or at least partially above ground, and a transportation pod configured to secure items therein for transport. The system also includes a transportation actuator configured to propel the transportation pod through the transportation tube, wherein the transportation actuator includes at least one cable configured to interface with the transportation pod, the at least one cable being driven by a motor to move the cable and the transportation pod through the transportation tube. The system also includes a first access point located proximate a first end of the transportation tube, wherein the first access point includes a first opening configured to allow the transportation pod to be received into or removed from the transportation tube. The system also includes a second access point located proximate a second end of the transportation tube, wherein the second access point includes a second opening configured to allow the transportation pod to be received into or removed from the transportation tube.

In accordance with another aspect of the present disclosure, a system for transporting one or more items includes a transportation tube disposed at least partially underground or at least partially above ground, and a transportation pod configured to secure items therein for transport. The system also includes a transportation actuator configured to propel the transportation pod through the transportation tube, wherein the transportation actuator includes a track extending through the transportation tube and a cable disposed at least partially inside the track, the cable configured to be coupled to the transportation pod as the transportation pod is propelled along the track. The system also includes a first access point located proximate a first end of the transportation tube, wherein the first access point includes a first opening configured to allow the transportation pod to be received into or removed from the transportation tube. The system also includes a second access point located proximate a second end of the transportation tube, wherein the second access point includes a second opening configured to allow the transportation pod to be received into or removed from the transportation tube.

In accordance with another aspect of the present disclosure, a system for transporting one or more items includes a transportation tube disposed at least partially underground or at least partially above ground, and a transportation pod configured to secure items therein for transport. The system also includes a transportation actuator configured to propel the transportation pod through the transportation tube, wherein the transportation actuator includes one or more pumps coupled to the transportation tube and configured to pressurize a fluid medium through the transportation tube such that the pressurized fluid medium propels the transportation pod through the transportation tube. The system also includes a first access point located proximate a first end of the transportation tube, wherein the first access point includes a first opening configured to allow the transportation pod to be received into or removed from the transportation tube. The system also includes a second access point located proximate a second end of the transportation tube, wherein the second access point includes a second opening configured to allow the transportation pod to be received into or removed from the transportation tube.

In accordance with another aspect of the present disclosure, a system for transporting one or more items includes a first transportation tube disposed between a first location and a second location and a second transportation tube disposed between the second location and a third location. The first transportation tube includes a first transportation actuator configured to propel a transportation pod containing items through the first transportation tube between the first location and the second location. The second transportation tube includes a second transportation actuator configured to propel a transportation pod holding items through the second transportation tube between the second location and the third location. The system also includes a first access point at the first location, the first access point including a first opening configured to allow a transportation pod to be received into or removed from the first transportation tube. The system also includes a second access point at the second location, the second access point including a second opening configured to allow a transportation pod to be received into or removed from the first transportation tube, the second transportation tube, or both. The system also includes a third access point at the third location, the third access point including a third opening configured to allow a transportation pod to be received into or removed from the second transportation tube.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
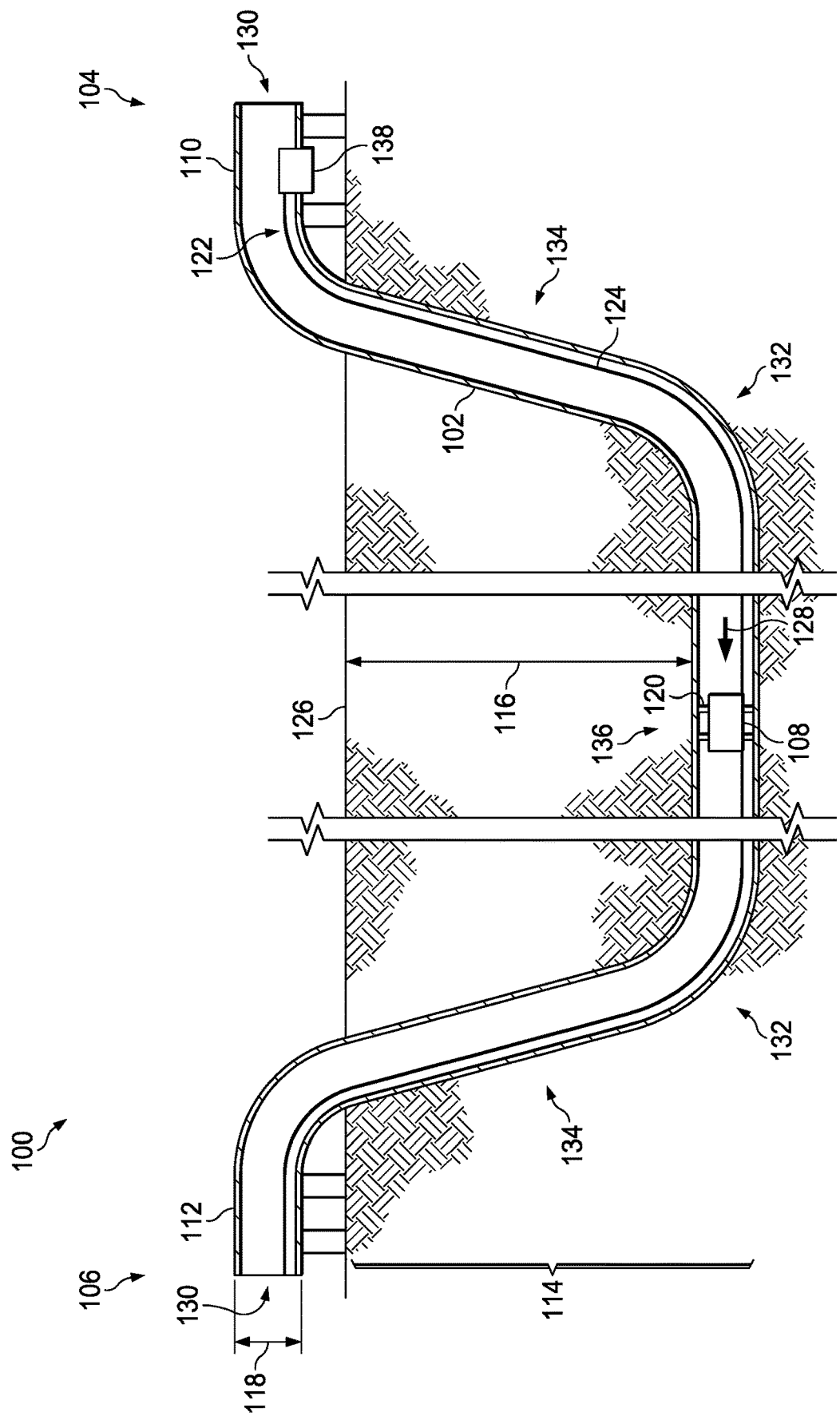
FIG. 1 is a schematic partial cross-sectional view of an integrated transportation system, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

The present disclosure provides a clean energy transportation system that offers transformational changes to the existing methods of motor vehicle transportation. Adopting the new technological advances described herein will enable significant operating changes to meet the new supply and demand requirements of the growing eCommerce economy, while being environmentally friendly and safe to better serve humanity. The clean energy transportation system described herein provides a low-cost, pollution-free, land resource and space saving transportation system suitable for all kinds of items including appropriately sized mail, packages, medicine, food, toxic chemicals, nuclear waste, and water, among others.

Disclosed embodiments are directed to systems and methods for transporting items between multiple locations through a network of transportation tubes. The items may be disposed in one or more transportation pods, which are propelled through the tubes via associated transportation actuators. The network of transportation tubes and their transportation actuators may deliver items in the transportation pods from a location at one node of the network of tubes to a location at any other node in the network of tubes. The network of transportation tubes may include tubes that are at least partially underground. In other embodiments, at least one or more of the tubes may be located above ground.

The disclosed systems and methods provide a re-thinking of the future of transportation in response to consumers and suppliers being continuously faced with higher costs, labor shortages, and regular bottlenecks in ports, roads, highways, and airports. The disclosed systems and methods may improve the efficiency of on-time delivery of goods to customers. In particular, the disclosed transportation systems and methods may operate with high speed, efficiency, and reliability compared to existing transportation techniques, since the speed through which items are transported in the tube does not depend on weather or traffic conditions. The disclosed transportation systems and methods may be used to deliver letter-based mail, packages, food (e.g., groceries or prepared foods), pharmaceuticals, transplant organs, emergency supplies, drinking water, household goods, other retail products, storm water, building materials, tubulars, hazardous chemicals, waste matter, and other goods to one or more locations connected by the network of tubes.

The disclosed transportation systems and methods are environmentally friendly and sustainable, since propelling the transportation pods through the network of transportation tubes may produce no or very low carbon emissions, much lower than is possible using existing transportation techniques. For example, the transportation systems and methods may be fueled partially or entirely by wind energy, solar energy, and/or natural gas. The disclosed transportation systems and methods may reduce the need for additional trucks, delivery vehicles, and private vehicles on the road, thereby improving road conditions, reducing traffic, and reducing emissions. As such, the disclosed transportation systems and methods are a major re-orientation and re-alignment of existing systems that is disruptive to create a better mode of delivery. The disclosed transportation systems and methods aim to be operationally carbon neutral. In addition, the disclosed transportation systems and methods may even have a net "carbon negative" impact on the transportation industry by offsetting or displacing millions of motor vehicles that would otherwise be releasing emissions and polluting the air. The disclosed transportation systems and methods may be particularly beneficial in urban and suburban regions, where the population density and demand for delivery services is higher.

The use of a partially subsurface and partially above surface transportation system that is fueled by solar, wind, and/or natural gas creates a practical process to bring about broad-based changes to: catalyze rapid delivery shifts, offer engineering solutions, and develop new infrastructures to address complex problems in polluted and congested urban cities and states. The disclosed technology may accelerate the transition to a cleaner economy while building resilience to provide necessities to people impacted by severe weather-related calamities.

Turning now to the drawings, FIG. 1 depicts a system 100 for transporting items in accordance with an embodiment of the present disclosure. The system 100 includes a transportation tube 102 (referred to hereinafter as a "tube") extending between a first location 104 and a second location 106. The tube 102 may take the form of a pipe in certain embodiments. The system 100 also includes at least one transportation pod 108 (referred to hereinafter as a "pod") disposed in the tube 102 or configured to be disposed in the tube 102. As illustrated, the tube 102 may be disposed at least partially underground. The tube 102 may be disposed entirely underground except at access points 110 and 112 (e.g., at opposing ends of the tube) disposed at the first and second locations 104 and 106, respectively. In other embodiments, the tube 102 may be disposed entirely above ground. In other embodiments, the tube 102 may be disposed entirely underground with access points 110 and 112 located below ground (e.g., in a basement level of a building). In still other embodiments, the tube 102 may include some portions located below ground and other portions located above ground. For example, a tube 102 spanning very large distances (e.g., hundreds of miles) between cities may include underground portions in the city limits and an above ground portion spanning a larger distance through remote areas outside of the cities.

Any underground portions 114 of the tube 102 may be located at a desired depth 116 underground. The depth 116 may be selected depending on various factors, such as the geography, topography, and/or geology of the earth spanning the locations 104 and 106 connected by the tube 102. In some embodiments, the tube 102 may include underground portions that are located below the waterline or water table in the region through which the tube 102 extends. This may prevent certain environmental risks in the event of a leak in the tube 102 and/or pod 108. In other embodiments, the tube 102 may include an underground portion 114 that extends through one or more bodies of water.

Figure 6:
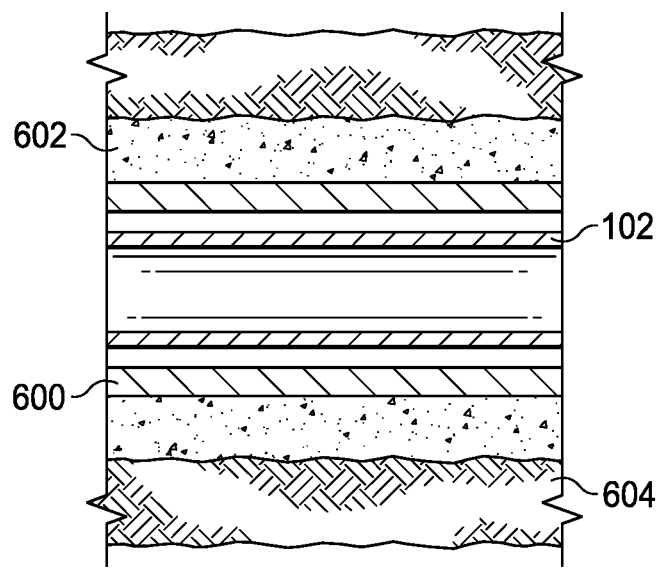
FIG. 6 is a schematic cross-sectional view of a transportation tube in a protective structure, in accordance with an embodiment of the present disclosure.

In certain embodiments, sections of the tube 102 which are located underground may be surrounded by a protective structure 600, as shown in FIG. 6. The protective structure 600 may be a larger diameter tube or casing through which the "host" tube 102 extends. The protective structure 600 may be constructed from steel or any other desired material. It may be desirable to include such a protective structure 600 in certain geologies such as, for example, subterranean formations that are particularly porous or that have high concentrations of fluid. As illustrated, the protective structure 600 may be cemented in place via cement 602 within the underground formation 604. Other embodiments may use foam instead of cement to secure the protective structure 600 in the underground formation 604. Not every line of tube 102 in a network or every portion of the same line of tube 102 may feature a protective structure 600. The protective structure 600 may simply be included in areas where it is deemed necessary due to features of the underground formation 604 through which the tube 102 extends. The protective structure 600 may be laid first underground, cemented or otherwise secured in place within the underground formation 604, and then the "host" tube 102 run through the protective structure 600. The protective structure 600 may provide increased stability to the tube 102 as well as prevent undesired fluid ingress or egress with respect to the tube 102.

Turning back to FIG. 1, the tube 102 may have any desired tube diameter 118 capable of allowing pods 108 holding items therein to be transported through the tube 102. The tube 102 may have a diameter of between, for example, 6 inches and 60 inches, more particularly between 18 inches and 36 inches. In one example, the tube 102 may have a diameter 118 of approximately 12 inches. In another example, the tube 102 may have a diameter of approximately 24 inches. In another example, the tube 102 may have a diameter of approximately 36 inches. In still other examples, the tube 102 may have a diameter of several feet (e.g., 4, 5, 6, 7, 8, 9, 10, or more feet), e.g., in cases where large cargo or even people are being transported.

The tube 102 may have any desired length for transporting pods 108 holding items between different locations 104/106. In an embodiment, the tube 102 may have a length on the order of, for example, tens of meters, hundreds of meters, miles, or up to hundreds of miles, depending on which locations 104/106 the tube 102 is connecting. For example, a shorter length tube 102 may be used to connect two buildings in a city's medical center or central business district. On the other hand, a longer length tube 102 may be used to connect a location in one city to a location in another city located hundreds of miles away.

The tube 102 may be built to accommodate any desired length of pods 108. In certain embodiments, one or more pods 108 transported through the tube 102 may have a length of between, for example, 8 inches and 72 inches, more particularly between 24 inches and 36 inches. This may be the case, for example, when the tube 102 is being used to deliver standard letter mail, mailed packages, food, or other delivered goods. In certain embodiments, one or more pods 108 transported through the tube 102 may have larger lengths, such as a length between, for example, greater than 6 feet, more particularly greater than 18 feet, and more particularly approximately 30 feet or more. This may be the case, for example, when the tube 102 is being used to deliver certain building materials such as, for example, lengths of pipe (e.g., typically about 30 feet) being transported as supplies for oil and gas operations (e.g., transportation to a well site or for construction of a pipeline). In such instances, the tube 102 itself may be constructed such that the tube between the two locations 104/106 does not have sharp direction changes but rather is substantially straight along its entire length. Shorter pods 108 may be transported along substantially straight or curved sections of tubes 102 within the network of tubes.

As illustrated, the tube 102 may include multiple portions having different relative orientations of the tube with respect to a horizontal plane. For example, the tube 102 may include one or more substantially vertical sections 134 extending downward from an access point (e.g., 110, 112). In an example, the tube 102 may include one or more substantially horizontal sections 136 (e.g., extending longitudinally underground) between the first location 104 and the second location 106. Although the illustrated tube 102 features substantially vertical and horizontal sections 134 and 136, other embodiments may include substantially straight or curved sections of the tube 102 that extend at any desired angle relative to the surface 126 of the earth. For example, in other embodiments, the tube 102 may include one or more angled sections that do not reach a substantially vertical orientation but still lower the tube below ground.

The tube 102 may include one or more bends 132 transitioning between the vertical, horizontal, and/or angled sections of the tube 102. In addition, the tube 102 may include one or more bends 132 transitioning the tube 102 to extend in different directions within the same substantially horizontal plane. Further, the tube 102 may include one or more bends 132 that transition the orientation of the tube 102 between any first and second direction in three dimensions. The diameter 118 of the tube 102 and the radius of curvature of any bends 132 in the tube 102 may be selected to be large enough that the pod 108 is able to effectively travel along the bends 132 without becoming stuck.

The tube 102 provides a line through which pods 108 may be directed between different locations 104 and 106. The tube 102 also provides protection from the surrounding environment so that the pod 108 is able to proceed quickly from one location to another along the tube 102.

The pod 108 is configured to receive and enclose items therein. The pod 108 functions as a container to hold one or more items being transported between the first and second locations 104 and 106. In an embodiment, the pod 108 is substantially cylindrical in shape. A cylindrical shape may help to maximize the holding capacity of the pod 108 while enabling the pod 108 to move easily through the tube 102. In other embodiments, different shaped pods 108 may be used. For example, in certain embodiments the pods 108 may be spherical, ellipsoid, rectangular prismatic, conical, or irregular in shape. The pod 108 may include one or more openings through which items may be loaded into one or more inner compartments of the pod 108. The openings may be selectively closed once the items are loaded to keep the items contained within the pod 108. It may be desirable to substantially fill the internal volume of the pod with item(s) (e.g., with one large item or several smaller items). Packing multiple items into the pod 108 tightly may help the items to not shift during transfer of the pod 108 between the first and second locations 104 and 106. A similar effect may also be accomplished by placing packing materials (e.g., cardboard, packing peanuts, paper, bubble wrap, etc.) in the internal volume of the pod 108 around the item(s) enclosed in the pod.

In some embodiments, multiple pods 108 may be connected together end to end and moved through the tube 102 in tandem. In certain instances, the first (lead) pod in the group of pods connected end to end may include a motor assembly for self-propelling the group of pods through the tube 102 in the event that the primary transportation actuator within the tube 102 (e.g., the motor-driven cable 124) malfunctions.

The tube 102 and pod(s) 108 may be used to transport various types of materials including, for example, letter mail, packaged mail, groceries, prepared delivery food, drinking water (e.g., in large or small bottles), household goods, other retail products, medicine (including pharmaceuticals and vaccines), human organs being transported to hospitals, for example, during inclement weather events, agricultural materials, construction materials, supplies for oil and gas operations (e.g., pipes, sand, proppant, electrical lines, hoses, other equipment, etc.), oil and gas products being transported (e.g., liquefied natural gas), chemicals, waste materials, radioactive materials, recyclables, volumes of storm water or clean water, and any other materials that fit within a particular sized pod 108. Certain tubes 102 in a tube transportation network may be designated for carrying certain types of items to accommodate, for example, a particular size or hazard level of the materials being transported.

The pod(s) 108 may be reusable, such that the same pod 108 may be used to transport one item or a first group of items from the first location 104 to the second location 106 and then later used to transport another item or a second group of items from the second location 106 to another location (e.g., back to the first location 104). In this way, the reusable pod(s) 108 may replace cardboard that is often used to package materials for delivery in existing systems, thereby reducing the amount of waste in landfills.

In an embodiment, the pod 108 may be equipped with a centralizer 120, as shown. The centralizer 120 may be a spring-loaded centralizer. The centralizer 120 may keep the pod 108 centered within the tube 102 and allow the pod 108 to effectively move through bends 132 in the tube 102 without becoming stuck. The centralizer 120 may include rollers or a surface with a smooth texture to reduce or minimize an amount of friction between the pod 108 and the tube's internal wall.

In an embodiment, the pod 108 may be equipped with mechanical features and software that enable the pod 108 to function as a drone when the pod 108 is outside of the tube 102. In some embodiments, for example, the pod 108 may be operated as a drone once it is removed from the tube 102 at an access point (e.g., 110 or 112) to fly through the air via rotating blades, roll along the ground on wheels, roll through desert or other difficult terrain via one or more wheels, move underwater with propellers, or a combination thereof.

The system 100 also includes a transportation actuator 122 configured to propel the pod 108 through the tube 102. In certain embodiments, e.g., as depicted in FIG. 1, the transportation actuator 122 may comprise at least one cable 124 designed to interface with and carry the pod 108 through the tube 102. The cable 124 may be driven by a motor 138 in the manner of a belt conveyance system, where the portion of the cable 124 attached to the pod 108 moves in one direction (arrow 128) between the locations 104 and 106 while another portion of the cable 124 not attached to the pod 108 moves in the opposite direction between the locations. The motor 138 may be bidirectional such that the same cable 124 can be operated to propel the pod 108 from the first location 104 to the second location 106, and vice versa.

In other embodiments, different portions of the same one or more cables 124 may be used to propel pods 108 in both directions at the same time. That is, the same cable 124 may extend through two tubes 102 arranged parallel to each other for transporting pods 108 in both directions between two locations 104 and 106. The cable 124 may be removably attached to the pod 108 via a hook, a latch, a carabiner, a lock, a plate that is connected to the cable 124 and pushes against an end of the pod 108, a trolley mechanism, a ball/socket connection, a combination thereof, or any other component capable of removably engaging the pod 108. It may be desirable to construct the at least one cable 124 and the attachment mechanism(s) used to removably attach the pods 108 to the cable 124 from the same material.

Figure 7:
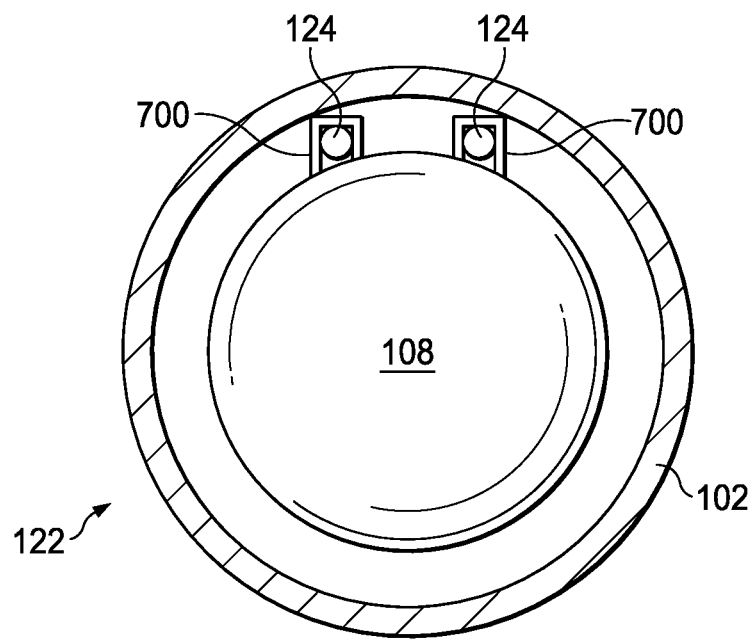
FIG. 7 is a schematic partial cross-sectional view of a transportation actuator having two cables used to transport a transportation pod through a transportation tube, in accordance with an embodiment of the present disclosure.

FIG. 7 illustrates an example transportation actuator 122 having two cables 124 used to transport the pod 108 through the tube 102. As illustrated, the pod 108 may be attached to the two cables 124 via two attachment mechanisms 700, which may be any of the types of cable attachment mechanisms discussed above. The cables 124 may be located one on either side of the tube 102 so as to secure the pod 108 on both sides of the pod 108. Using two cables 124 in this manner may help to provide increased stability of the pod 108 while it is being transported through the tube 102. As illustrated in FIG. 7, the two cables 124 may be located at an upper portion of the tube 102 so that the pod 108 hangs from the cables 124 in the tube 102. In other embodiments, for example, as shown in FIG. 1, the one or more cables 124 may extend through a lower portion of the tube 102 to pull the pod 108 through the tube 102 from the bottom end of the pod 108. Either position (upper or lower portion of the tube 102) may be used with a single cable 124 or with two or more cables 124.

When two or more cables 124 are used to pull the same pod 108 through one tube 102, it is desirable to precisely control the speed of the cables 124 to ensure that all cables 124 are moving at the same speed and the pod 108 does not become stuck in the tube 102. To that end, it may be desired to mechanically link the motors used to pull the cables 124 through the tube 102, to use a highly accurate controller to control the speeds of the motors, or to use a single motor to actuate both cables 124 simultaneously. Other constructions of a cable-based system for pulling pods at high speeds through tube 102 may be used in the disclosed transportation systems.

In certain embodiments, the one or more cables 124 extending through the tube 102 may be configured to transmit electricity therethrough. For example, the cables 124 may be constructed with one or more electric lines embedded therein. The one or more interior electric lines may be conductive lines surrounded by one or more layers of insulating material and then surrounded by one or more additional layers including an outer protective layer of the cable 124. The outer protective layer of the cable 124 may be a metal, thermoplastic, other polymer, or composite material layer designed to interface with the attachment mechanism 700 used to carry the pod 108 through the tube 102. Electrical transmission through the cable 124 may be used to supply power between the two locations 104/106. In this way, the cable 124 may function as an electrical transmission line. In certain embodiments, the electrical transmission through the cable 124 may be used to provide electrical power for operating a motor (e.g., 138 of FIG. 1) used to drive the movement of the cable 124 or an onboard motor of the pod 108.

In some embodiments, electrical transmissions lines may be secured inside the tube(s) 102 spanning various areas of critical infrastructure across a city and/or state, regardless of whether the electrical lines form part of a cable (e.g., 124) used to physically propel the pods 108. Securing transmission lines within the disclosed tube(s) 102 may protect the power grid from severe weather and climate events including, for example, strong winds or fires. In some embodiments, transportation tube 102 may include a mat constructed from rubber (or another insulating material) located between the cable 124 with its electric line and an interior edge (e.g., top) of the tube 102.

Figure 8:
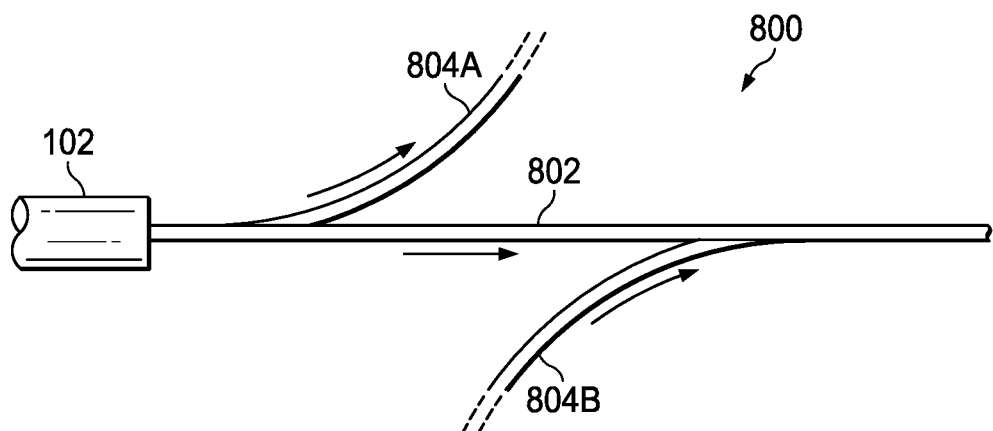
FIG. 8 is a schematic diagram illustrating a system for on-loading and off-loading one or more transportation pods from a cable-based transportation system, in accordance with an embodiment of the present disclosure.

FIG. 8 is a schematic diagram illustrating a system for on-loading and off-loading one or more pods from a cable-based transportation actuator at one of the end locations (e.g., 104 or 106 in FIG. 1) of the tube 102. As illustrated, an end location 800 may include a main line 802 exiting the end of the tube 102 and multiple connecting lines 804 branching off of or onto the main line 802. The main line 802 may include the one or more cables (e.g., 124 of FIG. 1) being moved through the tube (e.g., 102 of FIG. 1). Each connecting line 804 may branch from a different location along the length of the main line 802. The main line 802 may move at higher speeds than the connecting lines 804. This allows the cable-based transportation system to move the pods (e.g., 108 of FIG. 1) through the tube at high speeds while allowing the pods to move at slower speeds when they enter/exit the tube network at the end location 800 or are routed to another main line (not shown) sharing the same end location 800 as the main line 802. Each connecting line 804 may be constructed with a pulley mechanism similar to those used at the end of a ski-lift or cable car system.

Some connecting lines 804A may function as "exit ramps" with respect to the illustrated main line 802 and may include a brake or other mechanism used to reduce the speed of the cable at it moves along the length of the connecting line 804A away from the main line 802. Pods (e.g., 108 of FIG. 1) may be selectively routed from the main line 802 to any desired connecting line 804A via a control system and appropriate actuators used to transfer a pod from the main line 802 onto the desired connecting line 804A. Other connecting lines 804B may function as "entrance ramps" with respect to the illustrated main line 802 and may include an acceleration mechanism used to increase the speed of the cable as it moves along the length of the connecting line 804B toward the main line 802. An acceleration mechanism may include, for example, a variable speed motor used to propel the cable of the connecting line 804B. Pods (e.g., 108) may be selectively routed to the desired connecting line 804B from one or more other main lines (not shown) sharing the same end location 800, or the pods 108 may be added to the tube network at the end location 800 via one or more of the connecting lines 804B.

Figure 9A:
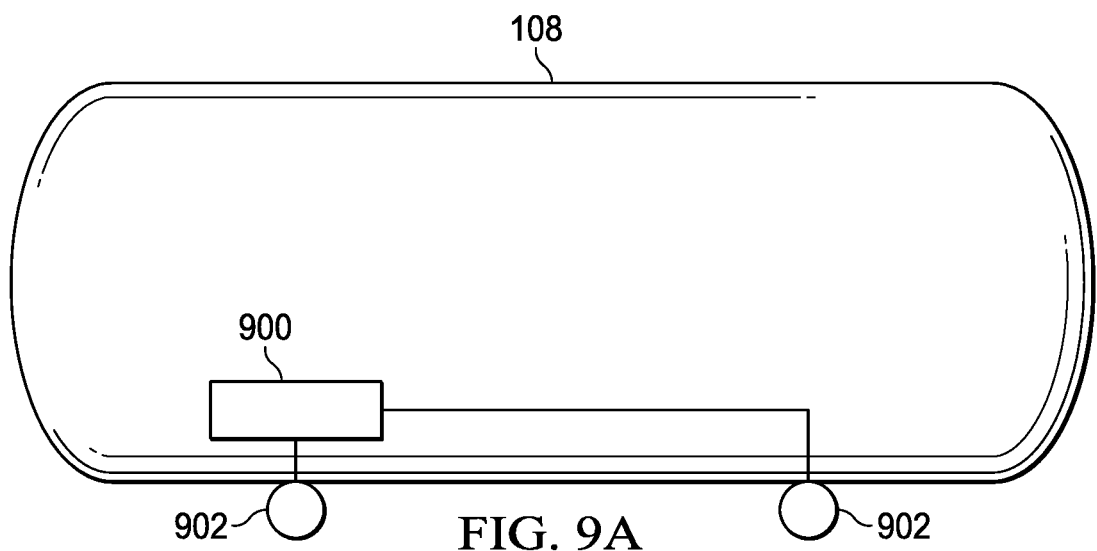
FIGS. 9A and 9B are schematic block diagrams showing examples of a self-propelled transportation pod, in accordance with embodiments of the present disclosure.
Figure 9B:
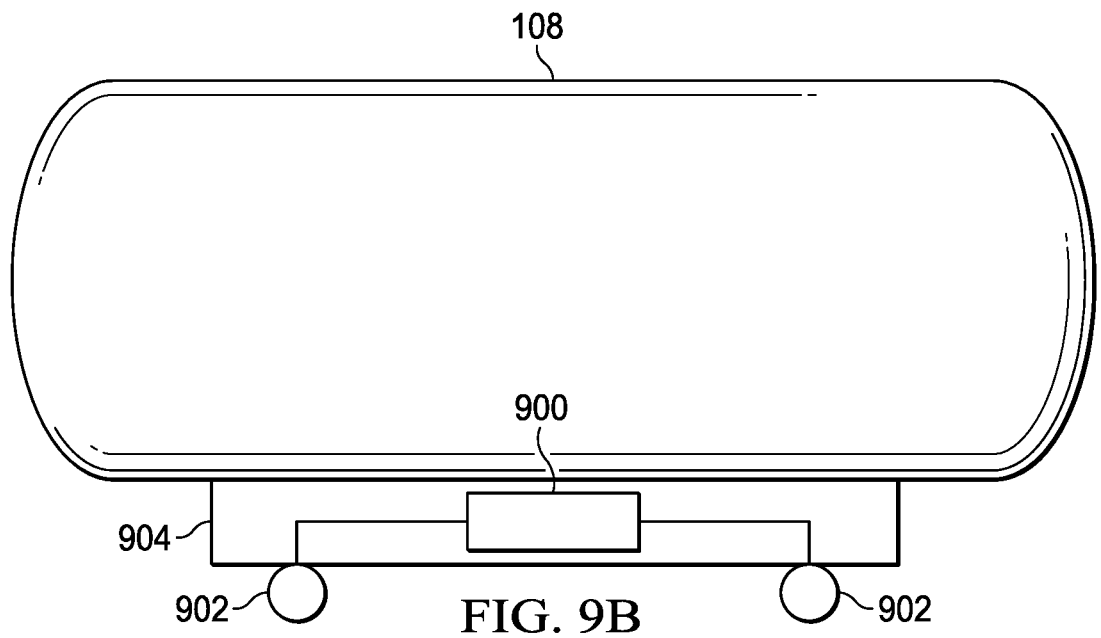

In other embodiments, different types of transportation actuators (e.g., other than cable(s)) may be used. For example, the pods may be self-propelled through the tube. As such, the transportation actuator may include one or more motors that are either integral to or removably attached to the individual pods being moved through the tube 102. In some embodiments, the motor used to self-propel a pod 108 through the tube 102 may be used as a back-up transportation actuator in the event that another transportation actuator (e.g., motor-driven cable) in the tube 102 malfunctions. FIG. 9A schematically depicts a pod 108 having a motor 900 therein configured to rotate one or more wheels 902 to propel the pod 108 through a tube. Other relative placements of the wheels 902 may be used in other embodiments depending on the configuration of the components on which the pod 108 moves. FIG. 9B schematically depicts a pod 108 that is removably attached to a carriage 904 having the motor 900. The carriage 904 may remain within the tube throughout operations, and the pod 108 may be attached directly to the carriage 904 when it is time for transporting the carriage 904 through the tube. As such, the carriage 904 may propel the attached pod 108 through the tube.

The motors 900 in the pods 108 and/or carriages 904 may be individual electric motors 900 operated by a battery power supply. The battery power supplies may be re-charged at a receiving station at the end of the tube 102. In other embodiments, the motors 900 in the pods 108 and/or carriages 904 may be electric motors 900 that are operated via electric power supplied by an electric cable extending through the tube. A cable extending through the tube 102 to provide electrical energy for operating the motors of the pod 108 and/or carriage 904 may be embedded in a floor or pad of the tube 102 in certain embodiments. However, other locations of such an electric cable may be possible in other embodiments.

For pods 108 that are self-propelled through the tube 102 (either by themselves or via attachment to a movable carriage), the tube 102 may include a track, pad, and/or rail along which the pods 108 ride through the tube 102. FIGS. 10A, 10B, and 11A-11D illustrate different types of tracks, pads, and/or rails along which a pod 108 may be propelled in the tube 102.

Figure 10A:
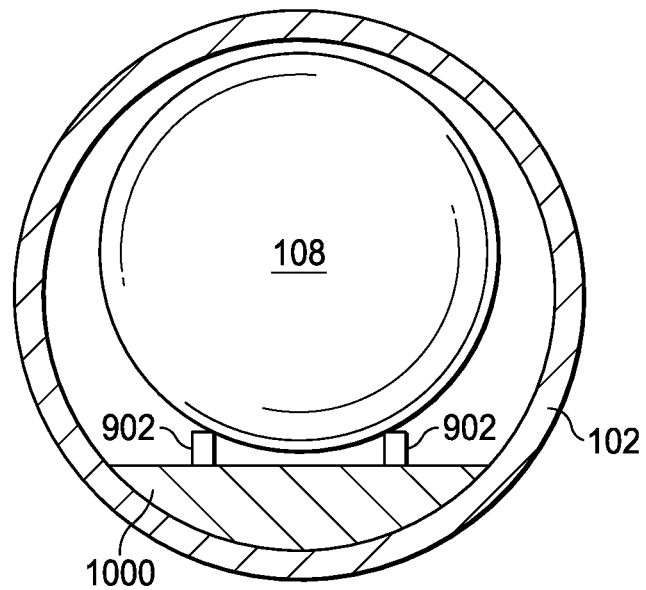
FIG. 10A is a schematic partial cross-sectional view of an inside of a transportation tube having a substantially flat pad therein, in accordance with an embodiment of the present disclosure.

As illustrated in FIG. 10A, the tube 102 may comprise a substantially flat pad 1000 along which the pods 108 may be propelled. For example, the pod 108 and/or carriage may include an internal motor that rotates wheels 902 on the pod 108 to propel the pod 108 along the pad 1000 and through the tube 102. In such instances, the pad 1000 may simply include a flat surface on which the wheels 902 are able to move the pod 108.

In other embodiments, the flat pad 1000 may not be present at all, but the pod 108 and/or carriage may instead comprise wheels 902 that interface directly with the radially inner edge of the tube 102 to essentially "roll" the pod 108 along the length of the pipe 102. In such embodiments, the wheels 902 may extend out from the pod 108 at different angles around the outer circumference of the pod 108.

Figure 10B:
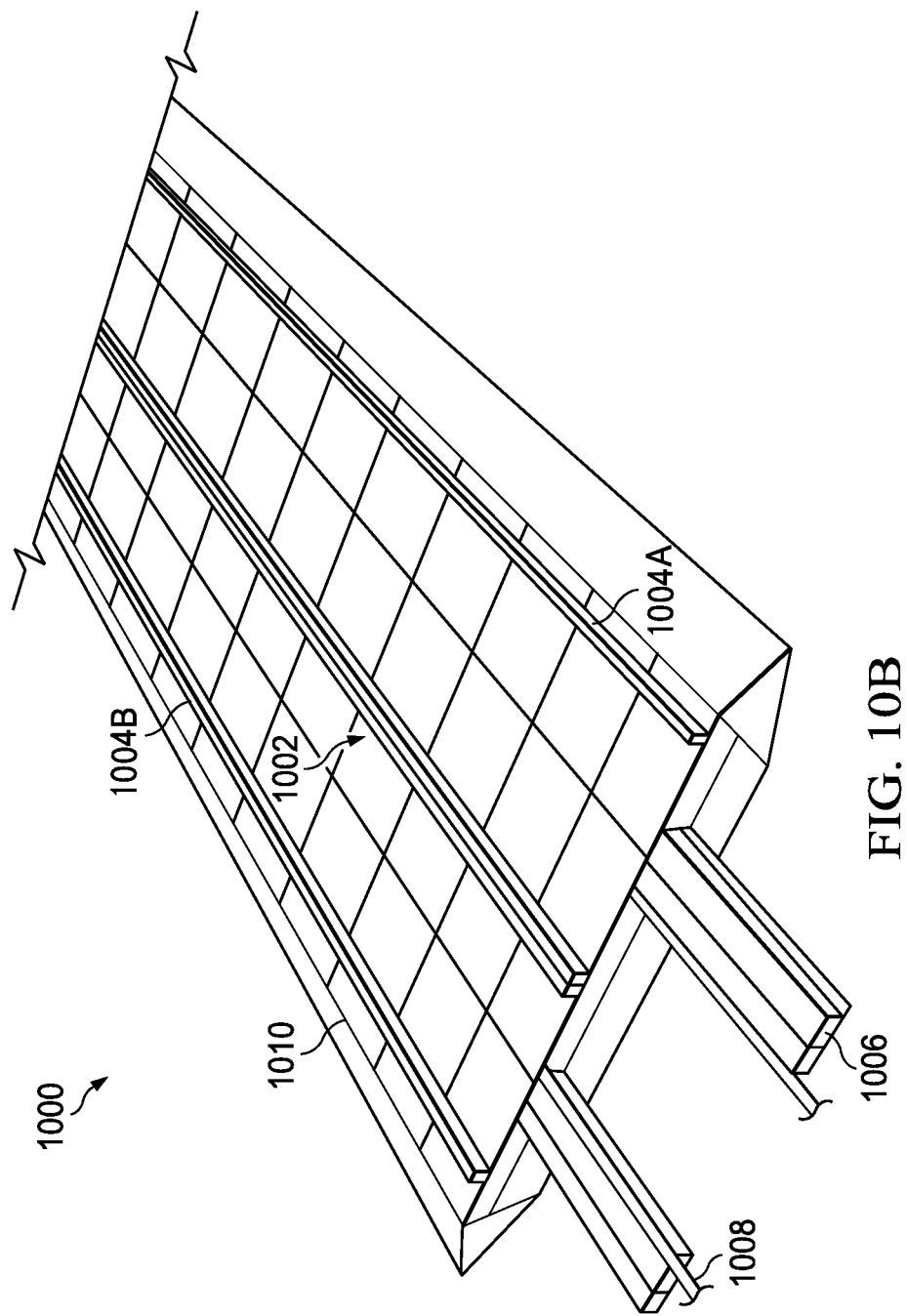
FIG. 10B is a partial cutaway perspective view of an example pad that may be used inside a transportation tube, in accordance with embodiments of the present disclosure.

FIG. 10B illustrates another example of a pad 1000 that may be used inside the tube 102 in certain embodiments. As illustrated, the pad 1000 may include a small protruding track 1002 extending upward therefrom toward the center of the pad 1000, along with two additional side tracks 1004A and 1004B on either side of the pad 1000. These tracks 1002 and 1004 may assist in guiding the pods 108 moving along the pad 1000. In some embodiments, the pad 1000 may include electromagnets 1006 and/or electrical cables 1008 disposed therein, as shown. These may be used to provide communication of energy through the pad 1000 for powering the movement of the pods 108 thereon and/or for general electricity transmission through the tube 102. In some embodiments, for example, if the pad 1000 is used in areas not enclosed within a tube 102, the pad 1000 may include solar panels 1010 formed thereon and from which electricity may be generated for powering the transportation process.

Figure 11A:
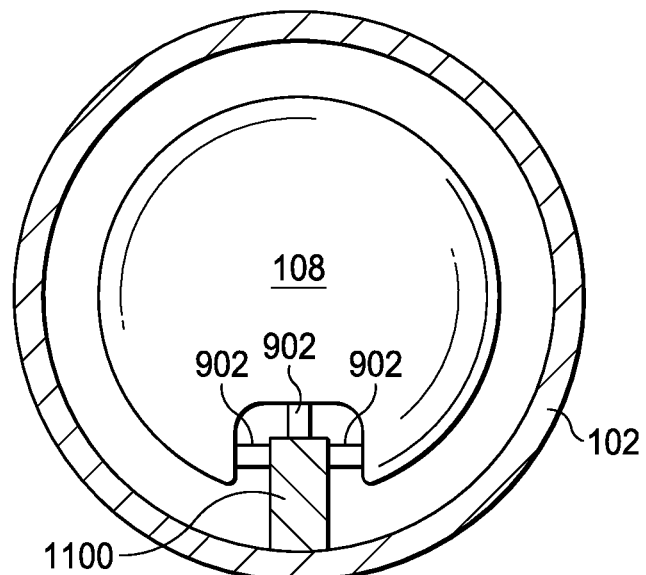
FIGS. 11A-11D are schematic partial cross-sectional views of an inside of a transportation tube having at least one protruding track disposed therein, in accordance with embodiments of the present disclosure.
Figure 11B:
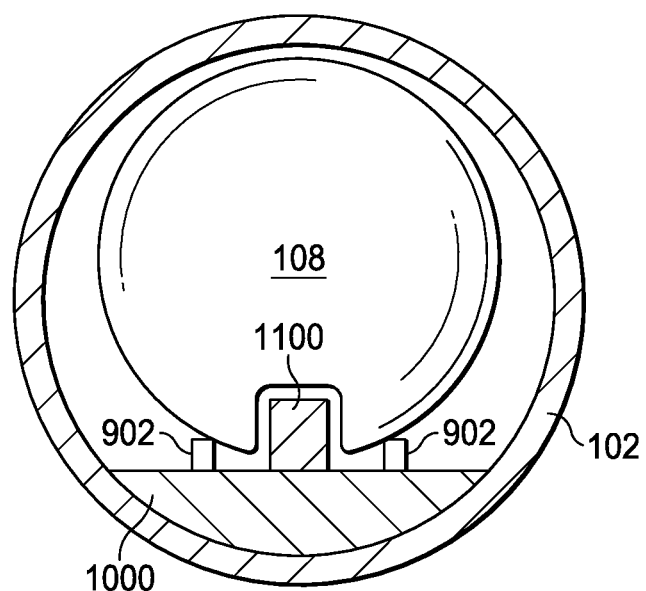
Figure 11C:
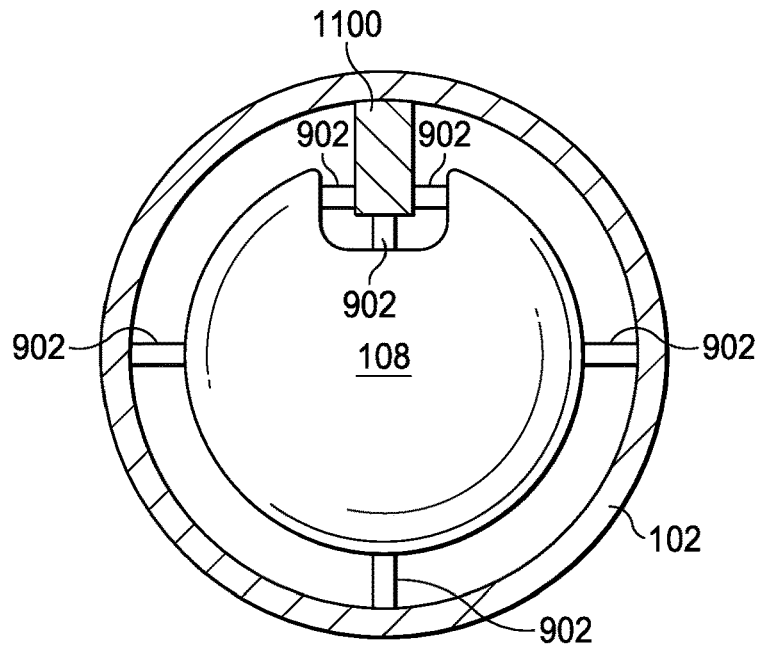

As illustrated in FIGS. 11A-11D, the tube 102 may comprise at least one protruding track 1100 along which the pods 108 may be propelled. The at least one protruding track 1100 may take the form of a rail, a rod, a frame, or any other elongated track protruding from a pad (e.g., pad 1000 of FIGS. 10A and 10B) or an inner wall of the tube 102. The addition of one or more protruding tracks 1100 provides increased reliability of the transportation system, since the track(s) 1100 are able to keep the pods 108 centered within the tube 102. The track(s) 1100 may also make it easier to change directions of the pod 108 at a junction between multiple tubes 102. In FIGS. 11A-11C, the pods 108 may be self-propelled via an internal or attached motor, or the pods 108 may be propelled via any other one of the transportation actuators discussed herein. Although FIGS. 11A-11D each show a single track 1100, it should be understood that other embodiments of the tube 102 may be equipped with two or more protruding tracks extending parallel to each other and configured to interface with corresponding grooves in the pods 108.

As illustrated in FIG. 11A, the track 1100 may extend upward from a lower portion of the tube 102. In FIG. 11A, the track 1100 may provide stability and/or guidance for a pod 108 being propelled through the tube 102. For example, the pod 108 may include, or be attached to a carriage with, wheels 902 that are rotated along opposing sides of the track 1000 itself and/or along the inner wall of the tube 102. In another example, the pod 108 and/or carriage may have a rolling, levitating, or other type of interface with the track 1100 and the pod 108 may move along the track 1100 in response to propulsion from a separate one or more cables, electromagnets, pressurized fluid, or pressurized air. The pod 108 and/or carriage may have a groove formed therein for receiving and centering the component over the track 1100.

As shown in FIG. 11B, other embodiments may include the track 1100 extending upward from a center portion of a pad 1000 at the lower portion of the tube 102 to provide stability and/or guidance for a self-propelled pod 108 that is riding along the pad 1000. For example, the pod 108 may include, or be attached to a carriage with, wheels 902 that are rolled along the pad 1000 on either side of the track 1100. In another example, the pod 108 and/or carriage may have a rolling, levitating, or other type of interface with the pad 1000 and/or track 1100 and the pod 108 may move along the pad 1000/track 1100 in response to propulsion from a separate one or more cables, electromagnets, pressurized fluid, or pressurized air. The pod 108 and/or carriage may have a groove formed therein for receiving and centering the component over the track 1100.

As shown in FIG. 11C, other embodiments may include a track 1100 extending downward from an upper portion of the tube 102. In FIG. 11C, the track 1100 may provide stability and/or guidance for a pod 108 moving through the tube 102. For example, the pod 108 may include, or be attached to a carriage with, wheels 902 that are rotated along opposing sides of the track 1100 itself and/or along the inner wall of the tube 102. In another example, the pod 108 and/or carriage may have a rolling, levitating, or other type of interface with the track 1100 and the pod 108 may move along the track 1100 in response to propulsion from a separate one or more cables, electromagnets, pressurized fluid, or pressurized air. The pod 108 and/or carriage may have a groove formed therein for receiving the track 1100 and centering the component beneath the track 1100.

Figure 11D:
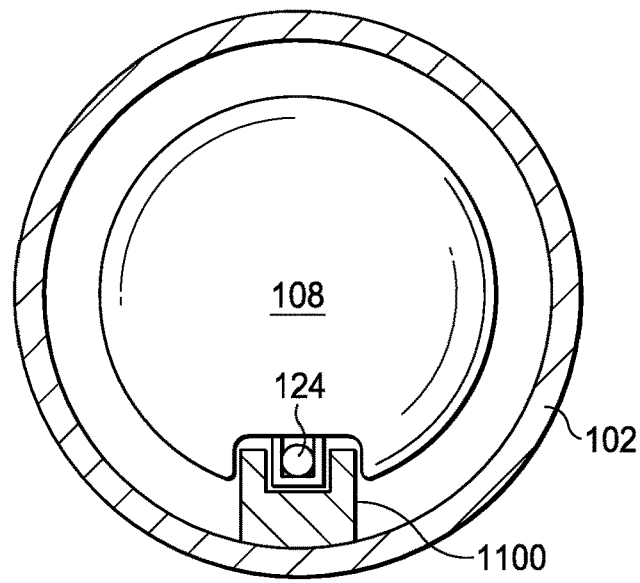

As shown in FIG. 11D, other embodiments may include a track 1100 with a cable 124 disposed therein, wherein the cable 124 is configured for attachment with the pod 108 and/or carriage and may be used to propel the pod 108 through the tube 102. In FIG. 11D, the track 1100 may provide stability and/or guidance for the pod 108 moving through the tube 102, while one or more cables 124 in the track 1100 are pulling the pod 108 through the tube 102. In certain embodiments, the cable 124 may be a chain located at least partially inside the track 1100. The chain may be attached either permanently to multiple carriages, or removably to individual pods 108. Incorporating the track 1100 and the cable 124 together may enable the cable 124 to propel the pod 108 through the tube 102 while the track 1100 provides improved guidance or direction of the pod 108.

In other embodiments of the system of FIG. 1, the transportation actuator 122 may include an electromagnet-based conveyance system configured to propel the pod 108 through the tube 102. The tube 102 may be built with a pad and/or track of controllable electromagnetic components therein. Electromagnetic components may be sequentially activated and deactivated along the length of the tube 102 to generate a changing magnetic field that propels the pod 108 from the first location 104 to the second location 106, or vice versa. In such embodiments, the pod 108 may be equipped with permanent magnets that pull the pod 108 through the tube 102 in response to the changing magnetic field generated along the length of the tube 102. Other types of transportation actuators using electromagnetic components may be used in other embodiments to propel the pod 108 through the tube 102. Electromagnetic actuation systems may be particularly useful due to the precision and control available via the electromagnets. In some embodiments, it may be possible to control the operation of such electromagnetic actuation systems to prevent or minimize shifting of contents within an individual pod 108 being moved through the tube 102 based on a detected weight of the contents in the pod 108.

In another example, the transportation actuator 122 may include a pneumatic actuator designed to propel the pod 108 through the tube 102 via pressurized air forced against a longitudinal end of the pod 108. Pneumatic actuation of the pod 108 through the tube 102 may be more practical for transporting the pod 108 over shorter distances rather than longer distances between the locations 104 and 106.

Figure 12:
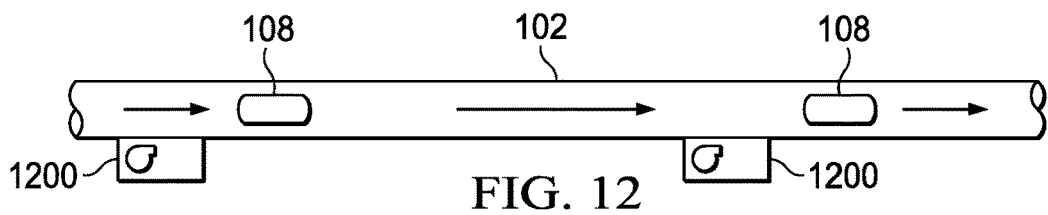
FIG. 12 is a schematic diagram of a transportation tube having multiple pumps disposed along the length of the tube for pressurizing a fluid carrying transportation pods through the tube, in accordance with an embodiment of the present disclosure.

In another example, the transportation actuator 122 may include one or more pumps coupled to the tube 102 and configured to pump a fluid medium through the tube 102, wherein the pressurized fluid propels the pod 108 through the tube 102. FIG. 12 schematically illustrates a tube 102 running from a first location to a second location and having multiple pumps (or pumping stations 1200) disposed along the length of the tube 102 for pressurizing a fluid to carry pods 108 through the tube 102. In such embodiments, the pods 108 may be impervious to fluid ingress via appropriate seals at the doors or other access points on the pods 108. The transportation system of FIG. 12 may include multiple pumping stations 1200 each with one or more pumps to ensure that the transportation fluid maintains a desired pressure for moving the pods 108 along the entire length of the tube 102. The pumping stations 1200 may also include quality control equipment (e.g., sensors, control/monitoring equipment, etc.) for monitoring the pressure, fluid composition, and other features of the transportation fluid so as to identify any issues that may occur with the transportation along the tube 102.

The transportation fluid being pumped through the tube 102 may include water in some embodiments. The water may be filtered or otherwise controlled to have a certain cleanliness, conductivity, and/or concentration of dissolved contents in the water. In other embodiments, the water may contain contaminants and thus only be slightly filtered, if at all. In some instances, the water may be storm water needing to be removed from the area of the first location after a large rainfall or natural disaster. In some embodiments, the first location may be a city or region (e.g., some parts of Texas, Louisiana, Florida, etc.) that is prone to large amounts of rainfall, flooding, hurricanes, sea level rise, and/or other natural disasters, while the second location may be in a region prone to drought or having little available water (e.g., some parts of California, Nevada, etc.). As such, the fluid being pumped through the tube 102 may function as both the transportation actuator 122 used to propel pods 108 through the tube 102, as well as a product itself that is being delivered through the tube 102 from the first location to the second location. Upon reaching the second location, at least a portion of the transportation water may be sold at the second location, provided for commercial use at the second location, or reused for transporting items to another location in the transportation network.

In other embodiments, the transportation fluid being pumped through the tube 102 may include a high viscosity fluid, such as a gel. The gel transportation fluid may be specially formulated to prevent erosion of the inside of the tube 102 and/or the pods 108 being propelled through the tube 102. The use of a gel as the transportation fluid may also prevent issues from arising due to differing levels of conductivity of the transportation fluid, thereby providing greater consistency in the transportation process than may be possible using water naturally occurring at the first location.

Other types of transportation actuators 122 may be used to move the pod 108 through the tube 102 than those described herein. For example, the transportation actuators 122 may include any actuator or equipment capable of propelling a body through a tube.

Turning back to FIG. 1, the system 100 includes the first access point 110 located proximate a first end of the tube 102 and the second access point 112 located proximate a second end of the tube 102 opposite the first end. Each access point 110/112 includes an opening 130 configured to allow the pod 108 to be received into the tube 102 and/or removed from the tube 102. One or both of the access points 110/112 may include space and/or equipment as necessary to couple (e.g., mechanically, magnetically, pneumatically, fluidly, etc.) the pod 108 to the transportation actuator 122 associated with the tube 102, or decouple the pod from the transportation actuator 122. In the illustrated embodiment having a cable-based actuation mechanism, for example, the access points 110/112 may provide space and/or equipment necessary to mechanically attach or detach the pod 108 from the cable 124. In an example, the cable 124 may include a series of hooks, locks, connectors for a plate, or other engagement features spaced relatively equidistant from each other and designed to attach to a complementary engagement feature on the pod 108 or to an end of the pod 108.

The access points 110/112 may provide space necessary for a user, a separate conveyor, or a robotic component to position the pod 108 into engagement with the cable 124 (or other transportation actuators), thereby allowing the cable to move the pod 108 through the tube 102. In embodiments where the pod 108 is pneumatically propelled through the tube 102, one or both access points 110/112 may include a pneumatic actuator (e.g., one or more valves) coupled to a source of pressurized air. The opening 130 may be positioned on a first side of the valve while the source of pressurized air is on the opposite side of the valve.

In certain embodiments, one or both of the access points 110/112 may include a launcher and/or receiver. The launcher may function similarly to and include similar components as a pig-launcher used to position a monitoring pig into a pipeline. For example, the launcher may include a launch barrel with the opening 130 being a cap or door to the launch barrel. The receiver may function similarly to and include similar components as a pig-receiver used to retrieve a monitoring pig from a pipeline. For example, the receiver may include a receiver barrel with the opening 130 being a cap or door to the receiver barrel. For the launcher and/or receiver at the access points 110/112, the cap or door of the respective barrels may be disposed at a longitudinal end of the barrels extending from the tube 102.

Figure 13A:
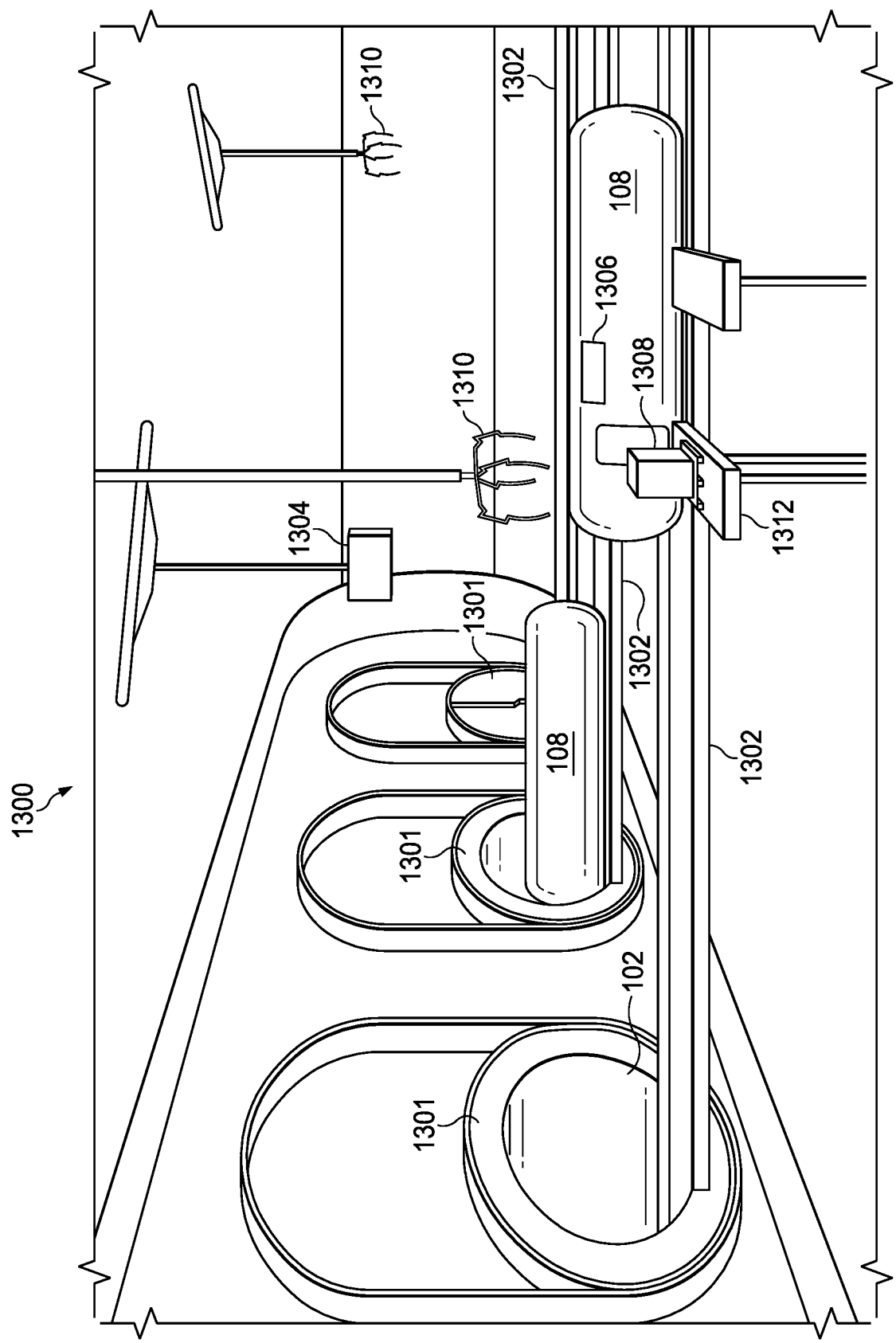
FIGS. 13A and 13B are perspective views of an example launching/receiving center, in accordance with an embodiment of the present disclosure.
Figure 13B:
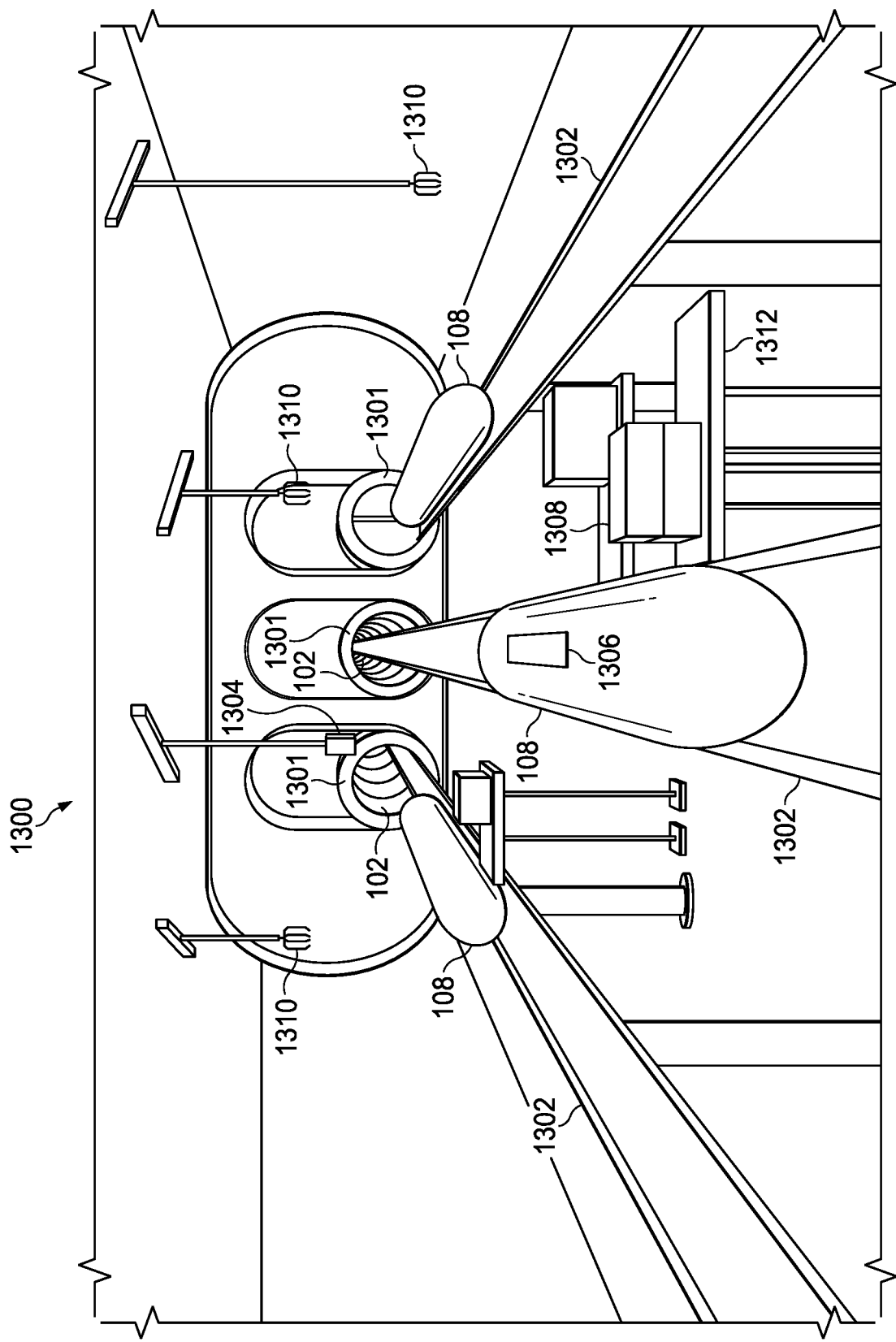

FIGS. 13A and 13B illustrate one example of a launching/receiving center 1300 that may be present at either end of a tube 102 in the disclosed transportation system. The launching/receiving center 1300 may therefore function as one of the access points 110/112 of FIG. 1. As illustrated, the launching/receiving center 1300 may be a large warehouse, distribution center, or similar facility in which items transported through tube(s) 102 may be stored or moved from one tube 102 to another within a network of tubes 102. In FIGS. 13A and 13B, the launching/receiving center 1300 includes three tubes 102 that together may form a single "line" between the launching/receiving center 1300 and another location. For example, the line of three tubes 102 may connect the launching/receiving center 1300 to another launching/receiving center at a distal end of the tubes 102. The three tubes 102 may extend parallel or substantially parallel to each other along their lengths from the launching/receiving center 1300 to their other ends.

It may be desirable to have three tubes 102 for each line connecting two locations. A first tube 102 may be configured to transport items in pods 108 in a first direction (e.g., toward the launching/receiving center 1300). This tube 102 is therefore a "receiving" or "incoming" tube. A second tube 102 may be configured to transport items in pods 108 in a second (opposite) direction (e.g., away from the launching/receiving center 1300). This tube 102 is therefore a "launching" or "outgoing" tube. A third tube 102 may be configured to transport items in pods 108 in either the first (incoming) direction or the second (outgoing) direction, whichever is needed depending upon the demands in of the two other directions. Furthermore, the third tube 102 may also be reserved as a backup tube in the event that either of the first or second tubes experience an issue.

It should be noted that while three tubes 102 are shown terminating the same "line" at the launching/receiving center 1300, any desired number of tubes 102 may terminate a line at the launching/receiving center 1300 in other embodiments. For example, a single line of tubes connecting two nodes in a network of the disclosed transportation system may include 1, 2, 4, 5, 6, 7, 8, 9, 10, 11, 12, 13, 14, 15, 16, 17, 18, 19, 20, or more tubes 102 configured to carry pods 108 in one or both directions along the line. Although the three tubes 102 illustrated in FIGS. 13A and 13B may have similar transportation actuators (e.g., propulsion along a track), other embodiments of the launching/receiving center 1300 may include multiple tubes 102 having different types of transportation actuators from each other. For example, the first tube 102 may include a cable that propels pods through the tube 102, while the second tube 102 may direct self-propelled pods therethrough. Any one of the tubes 102 extending between the launching/receiving center 1300 and another location may be configured for use with any of the following transportation actuators described above: motorized cable(s), track(s), self-propelled pods, electric cable(s), electromagnetic actuator(s), pneumatic actuator(s), fluid propulsion (e.g., via water, gel, or other fluids), or a combination thereof.

In FIGS. 13A and 13B, the tubes 102 may each include a gate 1301 (or port, door, or other opening) that can be selectively closed at the launching/receiving center 1300. In some embodiments, each gate 1301 may include an iris mechanism that can be actuated to spiral portions of the gate 1301 radially inward for closing and/or sealing the gate 1301. Any other desired type of construction may be used for selectively closing and/or sealing the gate 1301 in other embodiments. The gate 1301 may create a water- or air-tight seal upon closing in certain embodiments. In other embodiments, the tubes 102 may not feature gates 1301 but instead openings that are permanently open at the point where the tubes 102 enter into the launching/receiving center 1300.

In embodiments where a fluid such as water or gel is used to propel the pods 108 through one or more tubes 102, each associated tube 102 may include a drying station that is located proximate the gate 1301 at the end of the tube 102. The drying station may refer to, among other things, a portion of the tube 102 in which the actuating fluid is diverted or drained from the tube 102 to another location while the gate 1301 is closed. The drying station may also refer to a portion of the tube 102 or a location just outside the gate 1301 in the launching/receiving center 1300 having one or more fans used to dry the outside of the pods 108 that were propelled by the fluid.

As illustrated, a line 1302 may extend from each tube 102 into the launching/receiving center 1300, allowing the pods 108 to enter an open space of the launching/receiving center 1300 from the tube 102, or vice versa. The lines 1302 extending from the tubes 102 may be of similar or different construction from a track, pad, rail, cable, and/or other transportation actuator present within the corresponding tube 102. The lines 1302 extending from the tubes 102 are exposed within the launching/receiving center 1300 so that the pods 108 and/or items enclosed therein can be easily removed from or loaded onto the lines 1302 and associated tubes 102. The lines 1302 may be elevated (e.g., between approximately 6 and 50 feet, more particularly between 12 and 30 feet) above a factory or distribution center floor, as shown in the illustrated embodiment. In other embodiments, the lines 1302 may be within approximately 3 to 6 feet, more particularly within 4 to 5 feet, of the floor so that users can manually load and/or retrieve items from the pods 108.

As illustrated, one or more readers 1304 (e.g., barcode scanners, RFID readers, or others) may be present at each launching/receiving center 1300. Each pod 108 may include a barcode, an RFID tag, or some other identification component 1306 disposed thereon that may be read by the one or more readers 1304 upon entering any launching/receiving center 1300 (e.g., each time the pod 108 is moved through an access point). In some embodiments, one or more items held inside the pod 108 may include a barcode, an RFID tag, or some other identification component thereon that may be read by the one or more readers 1304 upon being removed from the pod 108, e.g., at the launching/receiving center 1300. In some embodiments, the readers 1304 may be entirely automated. For example, as illustrated in FIGS. 13A and 13B, the readers 1304 may be suspended from a ceiling of the launching/receiving center 1300 within an appropriate range and at an appropriate angle with respect to the different lines 1302 extending from the tubes 102 to read the identification component(s) 1306 on the pods 108. In other embodiments, the readers 1304 may be handheld readers operated manually by a user stationed at the launching/receiving center 1300.

In some embodiments, one or more automation components may be present at the launching/receiving center 1300 to provide automated loading of the pod 108 onto the line 1302 and/or into the tube 102, automated retrieval of the pod 108 from the tube 102 and/or the line 1302, automated loading of items 1308 into a pod 108, automated unloading of items 1308 from a pod 108, or a combination thereof. An example of automation components may include, for example, a robotic arm 1310 or other robotic component configured to extract the pod 108 from the line 1302 extending from the tube 102, configured to position the pod 108 onto the line 1302 extending from the tube 102, configured to unload items 1308 from pods 108 on the line 1302, configured to load items 1308 into pods 108 on the line 1302, or configured to selectively perform multiple of these operations. Another example of automation components may include a conveyor 1312 configured to deliver pods 108 from the line 1302 extending from one tube 102 to one or more other locations, configured to unload items 1308 from pods 108 on the line 1302, configured to deliver pods 108 from one or more other locations to the line 1302, configured to load items 1308 into pods 108 on the line 1302, or configured to selectively perform multiple of these operations. Other types of automation equipment may be used at the launching/receiving center 1300 in other embodiments. A combination of different types of automation equipment (e.g., robotic arm(s), conveyor(s), etc.) may be used at the same launching/receiving center 1300. The conveyors 1312 and/or robotic arms 1310 may be used at a launching/receiving center 1300 to transfer pods 108, or items 1308, between loading/unloading points associated with different lines of tubes. Thus, a pod 108 received at the launching/receiving center 1300 from one of the illustrated tubes 102 may be transferred using the automated components to another tube 102 for launching toward a new location from the launching/receiving center 1300. Multiple components of automation equipment and/or delivery paths may be used within the launching/receiving center 1300 to move pods 108 (or items 1308) between one set of tubes 102 and another.

In certain embodiments, the launching/receiving center 1300 may be an end point to which items in a pod 108 were being transported. As such, the launching/receiving center 1300 may be equipped with one or more lockers for holding items 1308 waiting to be picked up, a panel or shelving system for holding unused pods 108 that have been emptied, or a combination thereof. The automation equipment (e.g., robotic arms 1310, conveyors 1312, etc.) may automatically direct and/or deliver the items 1308 from a pod 108 to a specific locker and/or the emptied pod 108 to a location. The pod 108 and/or contents of a pod 108 may be assigned to a particular locker based on identification data read via the reader 1304 at the launching/receiving center 1300. In some embodiments, the movement of items 1308 and/or pods 108 at the launching/receiving center 1300 may be managed manually by people loading/unloading pods 108 from the tube 102 and moving contents 1308 of the pod 108 to desired locations.

Turning back to FIG. 1, the system 100 disclosed herein provides rapid transportation of items in the pod 108 through the tube 102. In an embodiment, for example, the transportation actuator 122 is capable of propelling the pod 108 through the tube 102 at a speed of 50-250 mph, more particularly 75-225 mph, and more particularly 100-200 mph.

The system 100 may be operated to transport items with relatively low or no carbon emissions. The term "carbon emissions" may refer to any one or more of several greenhouse gases such as, for example, carbon dioxide, methane, nitrous oxide, ozone, hydrofluorocarbons, and water vapor, among others, that add to global warming. For example, in an embodiment, the transportation actuator 122 may receive energy from one or more solar-based power generation systems, one or more wind-based power generation systems, and other "green" technology being developed. In another embodiment, the system 100 may utilize natural gas to fuel operation of the transportation actuator 122. That is, the system 100 may be operated by burning natural gas as fuel to operate the transportation actuator 122, which propels the pod 108 through the tube 102. Such operations may lead to net zero carbon emissions for transporting goods over long and short distances. When comparing the amount of emissions (if any) output from the disclosed transportation process to the amount of emissions that would otherwise be output from using existing transportation vehicles (e.g., cars, trucks, airplanes, boats, etc.) to transport the same amount of goods, the difference may suggest a net negative carbon emissions effect of switching to the disclosed transportation method.

Forming an integrated transportation system 100 with one or more underground portions 114 may involve drilling a tunnel through the earth and laying the tube 102 in the tunnel. Formation of the tunnel may involve the use of directional drilling equipment that can form the bends 132 and transition the resulting tunnel between different orientations with respect to the earth's surface 126. Formation of the tunnel may involve the use of micro-tunneling equipment, particularly for forming elongated substantially horizontal sections 136. In some embodiments, at least a portion of the tube 102 may be laid as the tunnel is being drilled (e.g., using casing-while-drilling equipment). In other embodiments, the tunnel may be partially or entirely drilled and then the tube 102 may be laid in the pre-drilled tunnel.

The tube 102 may be constructed from steel, a composite material (e.g., including carbon fibers), flexible polyvinyl chloride (PVC), flexible fiberglass, or any other desired material having the strength to be pushed through a tunnel during installation of the tube 102. Materials having a moderate degree of flexibility may be desired, particularly for construction of tubes 102 in environments susceptible to earthquakes. In embodiments where a track, pad, and/or rail are located in the tube 102, the track, pad, and/or rail may be constructed from rubber, thermoplastic, or another material with some amount of flexibility to enable easy movement of the pods 108 through the tube 102. In some embodiments, the tube 102 may include a number of smaller tube sections that are threaded end to end or otherwise connected in series to form the tube 102. In other embodiments, the tube 102 may include a coiled tubing or similar type of continuous tube that is unspooled into the tunnel to form the tube 102. In embodiments where the tube 102 is a continuous spoolable pipe, the tube 102 may be prefabricated with one or more cables 124, a track, a pad, and/or rail(s) disposed therein so that these components are spooled out with the tube 102 while the tube 102 is originally laid.

Figure 2:
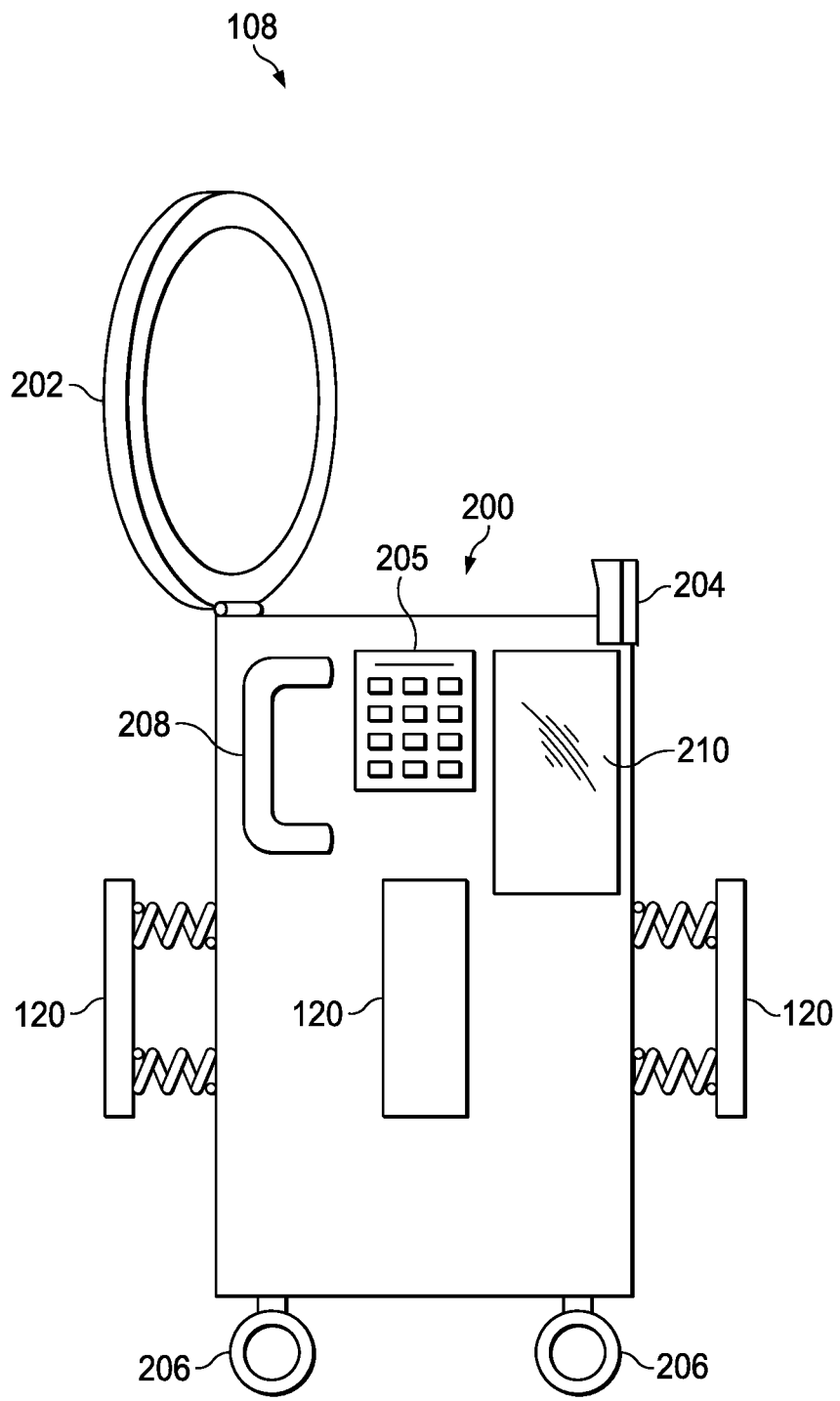
FIG. 2 is a perspective view of a transportation pod configured for transportation through the system of FIG. 1, in accordance with an embodiment of the present disclosure.

FIG. 2 illustrates an example pod 108 in accordance with an embodiment of the disclosure. The pod 108, as illustrated, may be cylindrical in shape. The pod 108 may include an opening 200 that enables loading and unloading of items into the pod 108. As illustrated, the opening 200 may include a hinged door 202. The hinged door 202 may include a lock 204 for securing the door 202 closed. In other embodiments, the opening 200 may include a cover that can be released and removed from the outer housing of the pod 108. Although the door 202 is illustrated as being disposed at one longitudinal end of the cylindrical pod 108, other embodiments may include a pod 108 having a door positioned along a portion of the pod 108 between its two longitudinal ends. In another embodiment, the pod 108 may include multiple doors 202 or other openings through which items can be loaded and unloaded from the pod 108. The door(s) 202 or other opening(s) may each have a hermetic seal. Thus, the pod 108 may be hermetically sealed to isolate the items inside the pod 108 from the environment inside the tube 102.

The pod 108 may be sized to receive and hold average sized mail and small packages. The pod 108 may be substantially hollow. The pod 108 may include one large open compartment therein, or multiple separate compartments for receiving different items.

The pod 108 may be customized for use by a particular company or individual to which the items therein are being delivered. For example, in an embodiment, the pod 108 may include one or more security features 205 that enables only an intended recipient to access the interior compartment(s) of the pod 108 where their items are stored. Such security features 205 may include, for example, a keypad whereby an individual code may be input by the recipient to access the contents of the pod 108. The code may be a particular code associated with the recipient or password set by the recipient that is the same each time a pod 108 is accessed by the recipient. For added security, the code may be a single-use code that is generated by a control system and communicated to the recipient via an email, SMS, MMS, or some other method for one-time use opening the pod 108. In an embodiment, the security features 205 may include a fingerprint scanner, retina scanner, camera communicatively coupled to facial recognition software, or other biometric scanner used to confirm the identity of the recipient prior to allowing access to the contents of the pod 108. In an embodiment, the security features 205 may include a physical key that must be input to the corresponding pod 108 assigned to the recipient. In an embodiment, the security features 205 may include a video camera configured to automatically record a video of the outside and/or inside of the pod 108 upon the pod 108 being unlocked or opened. In an embodiment, the security features 205 of any given pod 108 may include multiple different types of security features described above to provide multi-level identification of the recipient (e.g., using biometric scanning and a physical key to open the pod 108).

In some embodiments, the pod 108 may be temperature controlled. For example, the temperature in the pod 108 may be passively controlled via one or more of an insulating material built into or placed in the pod 108, ice packs or heat packs placed in the pod 108, or other methods to keep the contents at a desired temperature (e.g., keeping hot food hot, cold items cold, frozen items frozen, medicines cold, etc.). Insulating materials that may be built into or placed in the pod 108 may include, for example, polyurethane foam, polystyrene foam, polypropylene, polyethylene foam, phenolic foam, expanded synthetic rubber, expanded nitrile rubber, cork, Styrofoam, resin sheets, steel or aluminum plates to sandwich between other materials for framing maximum refrigeration of the pod 108, gel layers, or a combination thereof. In an embodiment, the insulating materials in the pod 108 may include a double layer of insulation with a gel layer in between.

Actively temperature-controlled pods 108 may be particularly useful for transporting medications, vaccines, transplant organs, or other medical or pharmaceutical items. In an embodiment, the pod 108 may be equipped with a battery powered cooling unit therein to maintain a desired cold temperature environment in the pod 108. In another embodiment, the pod 108 may be equipped with a battery powered heating unit therein to maintain a hot temperature environment in the pod 108. Actively heated pods 108 may be particularly useful for transporting certain materials such as construction materials, heavy metals, or materials that need to be kept in a certain state. Pods 108 equipped with active heating control may be constructed from different materials (e.g., platinum) than non-heated pods.

Figure 14:
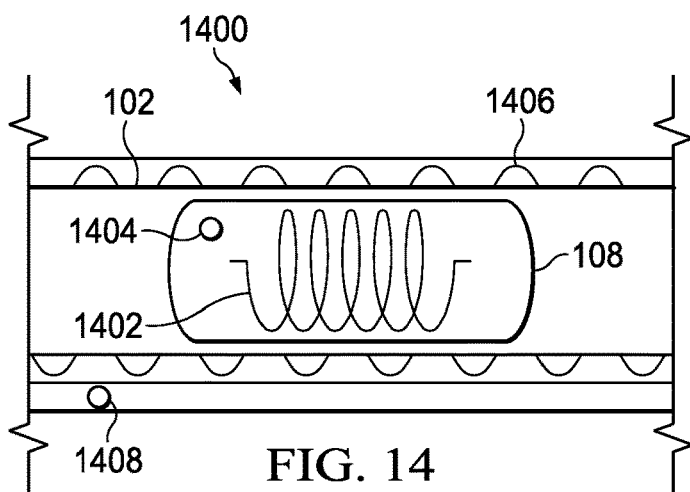
FIG. 14 is a schematic diagram of a transportation system having an active heat exchange system for controlling the temperature therein, in accordance with an embodiment of the present disclosure.

FIG. 14 illustrates a transportation system 1400 in which the pod 108 has an active heat exchange system 1402 (e.g., for cooling or heating). The heat exchange system 1402 may be a refrigeration coil, a thermoelectric cooling coil, or a thermoelectric heating coil. Some embodiments of the pod 108 may include multiple types of active heat exchange systems 1402 that can be selectively operated as desired based on the cargo being transported in the pod 108 at the time. Some embodiments of the pod 108 may be equipped with an onboard temperature sensor 1404 and a control system configured to operate the heat exchange system 1402 to raise or lower the temperature in the pod 108 with respect to a predetermined temperature threshold. Indeed, as was the case with certain vaccines used to inoculate certain populations against the COVID-19 virus, it was necessary to tightly control the temperature of the vaccines throughout their transport. The active heat exchange system 1402 in accordance with the present disclosure together with a suitable control system with constant feedback provides such a system. The active heat exchange system 1402 in the pod 108 may be used with or without an additional passive (e.g., insulated material) heat exchange system. Having insulation in the pod 108 as well may provide a backup source of cooling or heating in the event the active heat exchange system malfunctions.

As illustrated, the transportation system 1400 may further include an active heat exchange system 1406 in or surrounding the tube 102 to control the temperature of the tube 102 to be within a desired range. The active heat exchange system 1406 may include a refrigeration coil, a thermoelectric cooling coil, a thermoelectric heating coil, or any other desired active temperature management system. Some embodiments of the tube 102 may include multiple types of active heat exchange systems 1406 that can be selectively operated as desired based on an ambient temperature surrounding the tube 102 and/or the cargo being transported in pods 108 through the tube 102. In some embodiments, the tube 102 may include multiple thermoelectric coils located at different positions along the length of the tube 102 and operated either independently or all together. The tube 102 may be equipped with one or more temperature sensors 1408 disposed therein and a control system configured to operate the heat exchange system 1406 to raise or lower the temperature in the tube 102 with respect to a predetermined temperature threshold. The tube 102 may include one or more sensors 1410 disposed therein and configured to detect an approximate temperature of the pods 108 moving through the tube 102. The tube 102 may include multiple sensors 1410 disposed therein and configured to detect an approximate temperature of the pods 108 moving through the tube 102 at positions along the entire length of the tube 102.

Although FIG. 14 shows a system in which both the tube 102 and the pod 108 have active heat exchange systems, other embodiments may include just one or the other of the heat exchange systems 1402 and 1406. The passive heat exchange elements (e.g., insulating material) may be included in the pod 108 regardless of whether any active heat exchange systems are included in the tube 102 or pod 108, so as to provide extra time for transporting items in the event that the transportation actuator malfunctions.

Turning back to FIG. 2, the pod 108 may be constructed from any desired material, including plastic, elastomer (e.g., rubber), metal, fabrics, fiber glass, any of the temperature insulating materials described above, combinations thereof, or other compositions. It may be desirable for the pod 108 to be constructed from material that is light but durable. For example, in some embodiments, the pod 108 may be constructed from a thick, ruggedized plastic. In some embodiments, the pod 108 may be constructed with a clear window 210 formed therein, allowing a user to see the contents of the pod 108 without opening the pod 108. In an embodiment, the pod 108 may be entirely constructed from a clear material so that the contents therein are fully visible from outside of the pod 108.

The pod 108 may include a spring-loaded centralizer, as described above with reference to FIG. 1. As shown, the centralizer may include multiple centralizer arms 120 that protrude outward from the sides of the pod 108. The centralizer arms 120 may be positioned relatively equidistant around an outer circumference of the pod 108. In some embodiments, the centralizer arms 120 may include multiple arms disposed at the same circumferential location but at different longitudinal positions on the outside of the pod 108 to enable greater ease in navigating bends in the tube. As illustrated, the pod 108 may include wheels 206 and/or a handle 208 disposed thereon to enable easy transportation of the pod 108 when it is outside of the tube. For example, the illustrated configuration may enable a user to wheel the pod 108 like luggage to a new location once it is removed from the tube at its destination location.

In some embodiments, the pod 108 may include control components (described below) and actuators such as motors used to propel and steer the pod 108 once it is retrieved from the tube at its destination location. In such embodiments, the pod 108 may function as a self-directed drone, self-directed submarine, or self-driving vehicle once it arrives at a destination location. In some embodiments, the pod 108 may be programmed to automatically travel to a particular docking station, locker, or bay (e.g., at a launching/receiving center) upon arriving at a particular destination. In certain embodiments, the pod 108 may be programmed to operate as a flying drone only, a self-driven (rolling) drone only, or a submarine (swimming) drone only. In other embodiments, the pod 108 may be programmed and equipped to operate as multiple of these different types of drones, depending on the readings of one or more sensors on the drone, communications received at a destination location, and/or communications received via a satellite or other network connection.

Figure 15:
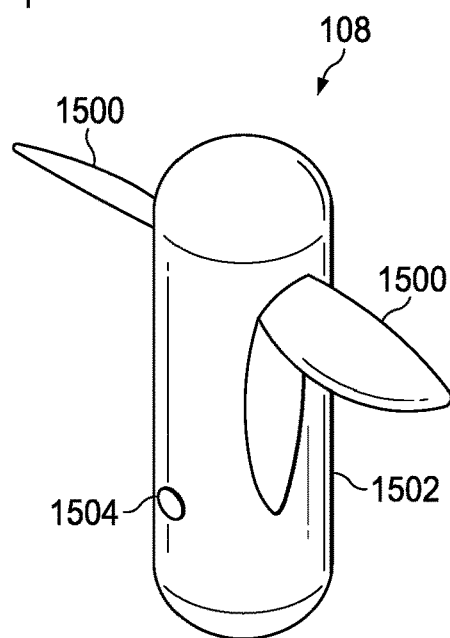
FIG. 15 is a perspective view of an example transportation pod configured for operation as a flying or swimming drone, in accordance with an embodiment of the present disclosure.

As shown in FIG. 15, a pod 108 may be equipped with at least two "wings" 1500 configured to propel the pod 108 as either a flying drone or a swimming drone, depending on the environment in which the pod 108 is output from the tube (e.g., 102 of FIG. 1) at a destination location. The wings 1500 may be retracted against the surface of a main body 1502 of the pod 108 while it is communicated through the tube, and the wings 1500 may be automatically extended and operated at the destination location once the pod 108 exits the tube. If sensors 1504 on the pod detect that the pod 108 is located in open air, one or more motors of the pod 108 may operate the wings 1500 as propellers or gliders to fly and self-direct the pod 108 through the air to a desired destination. If sensors 1504 on the pod detect that the pod 108 is surrounded by water, one or more motors on the pod 108 may operate the wings 1500 as paddles or a propeller to self-direct the pod 108 through the water to a desired destination.

Figure 16:
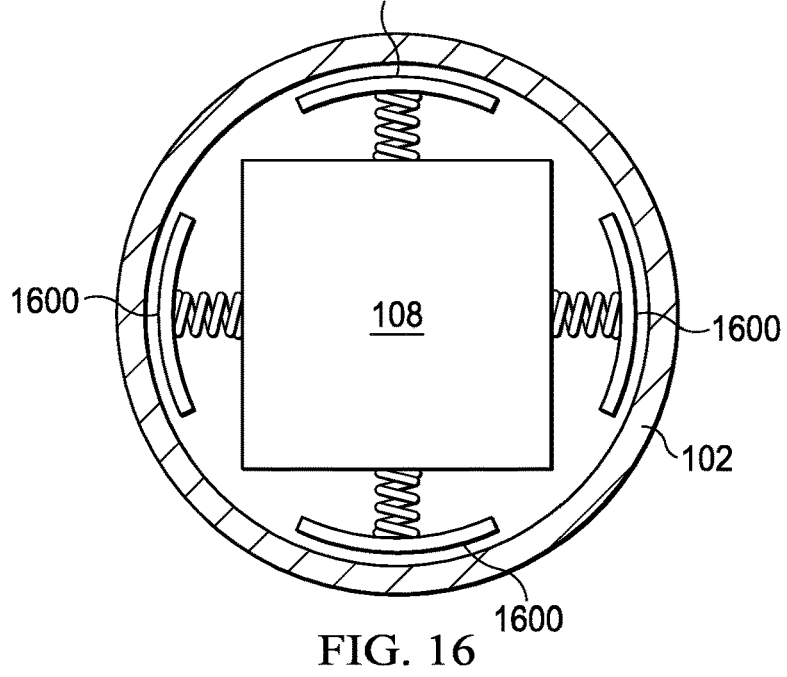
FIG. 16 is a schematic block diagram illustrating another transportation pod configured for transportation through the system of FIG. 1, in accordance with an embodiment of the present disclosure.

Although pods 108 are shown in the above illustrated embodiments as being substantially cylindrical, the pod 108 may take other shapes and forms in other embodiments. For example, as shown in FIG. 16, the pod 108 may be shaped substantially as a rectangular prism in other embodiments. A rectangular prism shaped pod 108 may allow an internal compartment of the pod 108 to be substantially filled with one or more rectangular packages, thereby reducing the shifting of items in the pod 108 during transportation. The rectangular prism shape may make more efficient use of space in the pod 108 and reduce the weight of the pod 108 for transportation through the tube 102 compared to a cylindrical pod with a similar sized internal compartment. In the illustrated embodiment, the pod 108 may include rounded centralizer arms 1600 extending from the rectangular prism shaped pod 108 to interface effectively with the internal walls of a standard tube. In other embodiments, the tube 102 itself may have a square or rectangular, instead of circular, cross section for transporting rectangular prismatic pods 108 therethrough.

Figure 3:
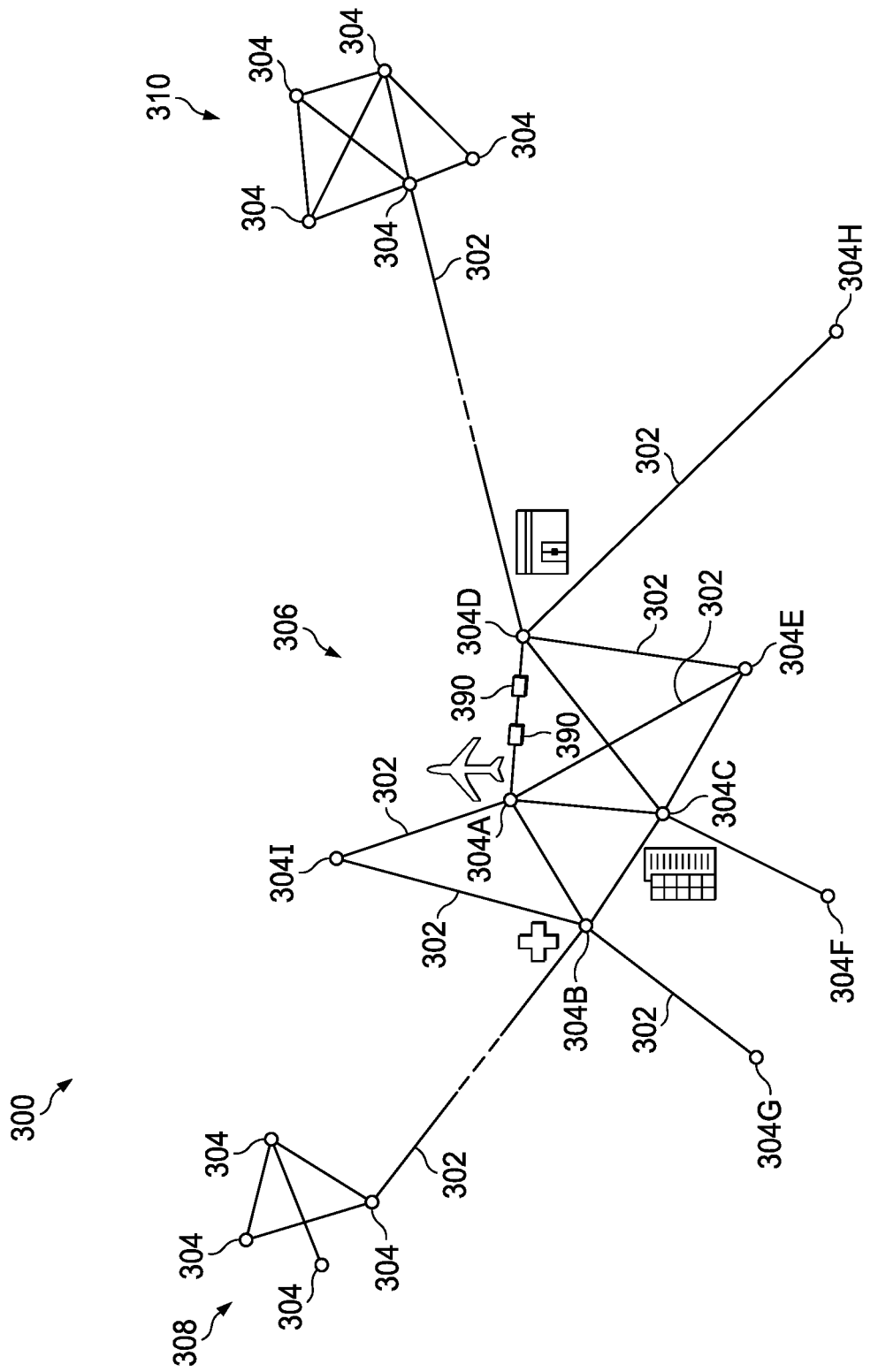
FIG. 3 is a schematic view of a network of node locations connected via an integrated transportation system, in accordance with an embodiment of the present disclosure.

The system 100 of FIG. 1 may be duplicated to connect a group of three or more locations. FIG. 3 illustrates a map of a network 300 of lines 302 (e.g., tubes) that may be used to transport items between a large number of locations 304. It should be noted that although several examples are given of the transportation system operating entirely or mostly within a series of transportation tubes (e.g., 102 of FIG. 1), in other embodiments the items may be transported along the lines 302 without being enclosed in tubes. For example, in other embodiments the lines 302 may simply be exposed tracks like the lines 1302 shown in FIG. 13 along which the pods are transported from one location to another.

Each location 304 represents a node in the mesh-type network 300 of tubes, and each location 304 may include at least one access point (e.g., 110/112 of FIG. 1; and/or launching/receiving center 1300 of FIGS. 13A and 13B) for loading and/or unloading pods into the network 300 of tubes. In some embodiments, the system may include line switching equipment at one or more locations 304 that enable switching of the pod from one line 302 to another adjacent line 302 in the network 300 without having to retrieve the pod from one access point and then launch it from another access point.

The locations 304 of nodes in the network 300 of tubes may include critical infrastructure areas (e.g., an airport 304A, a medical center 304B, a central business district 304C, and so forth) within a city 306. The locations 304 of nodes may include a distribution center 304D and/or any other locations (e.g., 304E) within the city 306. In addition, the locations 304 of nodes may extend to suburbs 304F-304I of the city 306. Furthermore, the network 300 may include long-distance lines 302 connecting different cities (e.g., city 306, a second city 308, and a third city 310). Certain lines 302 in the network 300 may cross state lines, for example, connecting multiple major cities in the U.S. (or comparably distant cities in other countries). Having cities connected via the network 300 of tubes in an integrated transportation system may enable supplies to be sent quickly to a city experiencing (or preparing for) a natural disaster from unaffected cities.

In certain embodiments, one or more lines 302 may be laid in the same areas as pre-existing infrastructure such as pipelines, train lines, highways, etc. so that the lines 302 can take advantage of existing right-of-way designations. When placed in the same areas as pre-existing highways, the lines 302 may be placed under the highway or alongside the highway. In an embodiment, the line 302 may include two tubes designed and operated to transport pods in opposite directions, the opposite directions of the tubes corresponding to the same directions as the flow of traffic on the portions of the highway under/along which the tubes are placed.

Each illustrated line 302 in the network 300 may include one or more tubes (e.g., 102 of FIG. 1). In some embodiments, a line 302 may include one tube that operates bi-directionally to propel pods holding items in either direction between two locations 304. Operating of the transportation actuator(s) of such a line 302 may involve controlling the timing and direction of pod movement through the tube. In other embodiments, a line 302 may include two or more tubes (e.g., 102 of FIG. 1), at least one tube propelling pods in a direction from a first location to a second location, and at least another tube propelling pods in the reverse direction from the second location to the first location. As discussed above with reference to FIGS. 13A and 13B, a line 302 may include three or more tubes, with at least one tube being a backup tube to be used in the event another tube encounters an issue. Having dedicated tubes for each direction (and at least one backup) may facilitate faster and more flexible transportation operations.

One or more maintenance stations 390 may be located along one or more lines 302 of the network 300. The maintenance stations 390 may provide additional points at which the inside of the tube may be accessed. The maintenance stations 390 may serve as locations for performing maintenance on a tube (e.g., pigging the tube), removing a broken down pod from a tube, clearing a blocked tube, addressing mechanical issues with the transportation actuator of a tube, releasing air pressure that has built up in a section of the tube, or a combination thereof.

In the network 300, certain lines 302 (or certain tubes on a given line 302) may be designated as "unclean" lines designed for carrying potentially hazardous materials, such as certain chemicals (e.g., ammonia, non-oxidizing biocides, etc.), waste from chemical plants, nuclear waste (liquid or solid) and/or by-products thereof, other radioactive materials, rare Earth metals, lithium ion batteries for disposal or recycling, or dirty water (e.g., storm water). In some embodiments, the lines 302 or individual tubes that are designated "unclean" may be constructed with additional shielding to prevent any potentially hazardous materials from leaking into or otherwise affecting the surrounding environment or other nearby transportation tubes. This shielding may include particular materials used to construct the unclean tube, or additional layers of material or tubes between the host tube and the outside environment. In embodiments where water containing contaminants (e.g., storm water) is used as the transportation actuator for moving pods through one of the unclean lines, the pods may similarly be built with additional shielding in the form of specialized coatings. In some embodiments, only pods carrying industrial materials or the like may be transported in the unclean lines with water containing contaminants running therethrough.

Existing techniques for transporting radioactive material (e.g., used in medicine, power generation, research/manufacturing, the military, nuclear waste, etc.) is highly regulated and typically carried out using tanker trucks, planes, trains, ships, etc. Special packaging may be involved depending on how radioactive the material being handled is. By providing unclean lines for transportation of radioactive materials, the disclosed systems and methods are able to bypass the existing transportation systems using trucks, cars, planes, and ships. The disclosed systems and methods therefore offer the option to transport radioactive and other hazardous material with little to no human involvement. The unclean lines (and pods to be used therein) may be equipped with safety features and appropriate shielding to comply with all required environmental regulations for properly containing the hazardous materials.

One or more unclean lines in the network 300 may have an end that does not connect to another node at the surface of the Earth but is instead built in at least a partially vertical direction down toward the Earth's core. These unclean lines may be used to bury nuclear waste or other hazardous material far from the Earth's surface to prevent pollution of the ground and nearby water sources.

In the network 300, certain lines 302 (or certain tubes on a given line 302) may be designated as "secured" lines designed for carrying items that are desired to be hidden and undetectable by surveillance systems such as RADAR, 3D seismic imaging, etc. In some embodiments, the lines 302 or individual tubes that are designated "secured" may be constructed with shielding to prevent any outside surveillance systems from detecting either the pods being moved through the tube, the contents of the pods, or the tube itself within the surrounding (e.g., underground) environment. This shielding may include particular materials used to construct the secured tube, or incorporating additional layers of material (e.g., certain metals or types of rocks) or tubes between the host tube and the outside environment. Secured lines may also transport pods having different constructions than those used in non-secured lines. In addition, the secured lines may terminate at a shielded or hidden room or facility at its end point locations 304. Additionally, or alternatively, the "secured" lines may include a plurality of sensors disposed along the length of the transportation tubes for scanning and tracking the transportation pods as they move through the transportation tube.

Different standards for the lines 302 and their corresponding transportation tubes (e.g., 102 of FIG. 1) and transportation pods (e.g., 108 of FIG. 1) may be applied based on the particular industry in which the lines 302 are being used. These standards may include, for example, the size (e.g., diameter and/or length) of the transportation pod (108), the size (e.g., diameter) of the transportation tube (102), how straight the transportation tube (102) is (e.g., a maximum radius of curvature along the length of the tube), security features present along the transportation tube (102) and/or on the transportation pod (108), the method or mode of transportation (e.g., type of transportation actuator) used in the transportation tube (102), the materials from which the transportation tube (102) and/or pod (108) are constructed, the presence or types of heat exchange systems used in the transportation pod (108) and/or the tube (102), a presence and/or number of sensors disposed along the length of the transportation tube (102), and/or a frequency of maintenance stations (390) or other access points along the length of the transportation tube (102).

Industries which may have their own standards for their lines of the disclosed transportation system may include, for example: mail and food delivery, medical, military or government, agriculture, construction, oil and gas, chemical, recyclables, hazardous materials disposal, and water transportation. The following are some examples of different standards that may be applied in certain industries. It should be noted that these are examples and not an exhaustive list, and other standards may be applied depending on the needs of the particular industries in which the system is being used. In the chemical, recyclables, hazardous materials disposal, and water transportation industries, the lines 302 may be configured as "unclean" lines as discussed above. In the military or government industry, the lines 302 may be "secured" lines as discussed above, and/or the transportation pods may include one or more security features as discussed above. In the medical industry, the lines 302 may be temperature controlled (e.g., via temperature control of the transportation pods and/or tubes) as discussed above. When used to transport oil and gas products such as, for example, liquefied natural gas (LNG), the pods communicated through the lines 302 may be constructed from a very strong material (e.g., incorporating carbon fiber, etc.) to sustain the high pressures of the LNG.

Figure 4:
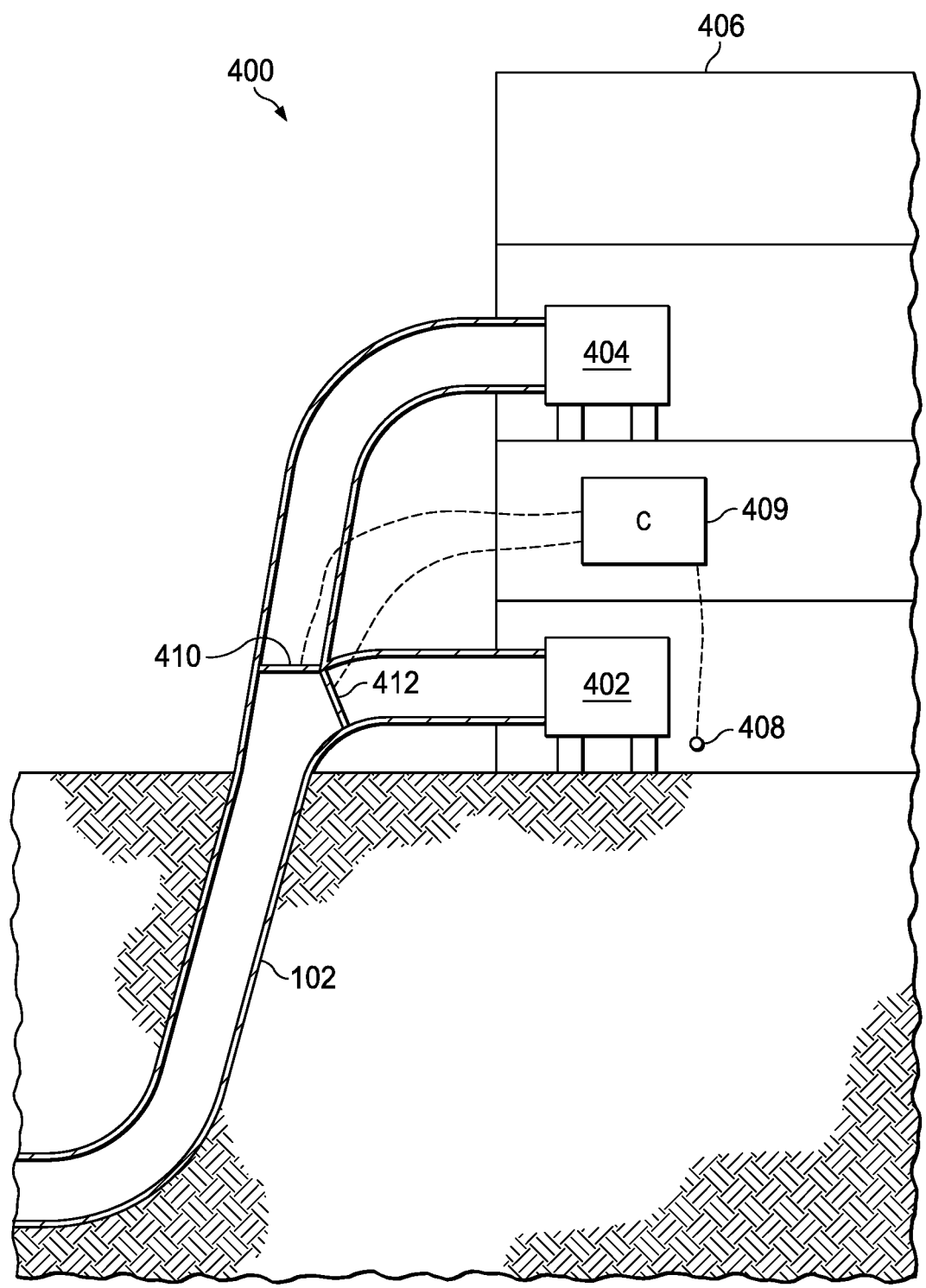
FIG. 4 is a schematic partial cross-sectional view of an access location of an integrated transportation system having multi-level access points, in accordance with an embodiment of the present disclosure.

FIG. 4 illustrates an access location 400 of an integrated transportation system having multi-level access points 402 and 404. As illustrated, at one location 400, the tube 102 may include two access points 402 and 404, each at different vertical levels. The lower access point 402 may be a default access point 402 at which a pod is typically accessed from the tube 102, while the higher access point 404 is a backup access point for use during certain situations. For example, the higher access point 404 may be used during emergency situations and/or natural disasters in which access to the lower level access point 402 is impeded. Such situations may include, for example, water that has flooded the lower levels of a building 406 having the access points. The tube 102 may include automated gates used to selectively close off access to one or both of the access points 402 and 404 as desired, so that the tube 102 is able to guide the pod to the appropriate access point. In an example, the lower level access point 402 may be equipped with a sensor 408 configured to detect the presence of water in the lower level. The sensor 408 may be communicatively coupled to a controller 409. The controller 409 may be communicatively coupled to a gate 410 proximate the upper level access point 404 and a gate 412 proximate the lower level access point 402. Upon the sensor 408 detecting the presence of water in the lower level of the building 406, the controller 409 may automatically close the gate 412 and open the gate 410, redirecting pods to the upper level access point 404. Access locations 400 having multi-level access points 402 and 404 may be particularly beneficial in cities near water and/or environments susceptible to flooding. Having multiple levels of access points may enable the disclosed transportation system to be immune to certain weather events, such as flooding, or sea level rise. As such, the multi-level access points 402 and 404 improve the ability to efficiently and reliably transfer items between two locations even amongst cities impacted by ongoing climate change. Embodiments of the present disclosure having multi-level access points 402 and 404 may also be used for the delivery of different items to different locations within the same building or area.

Figure 5:
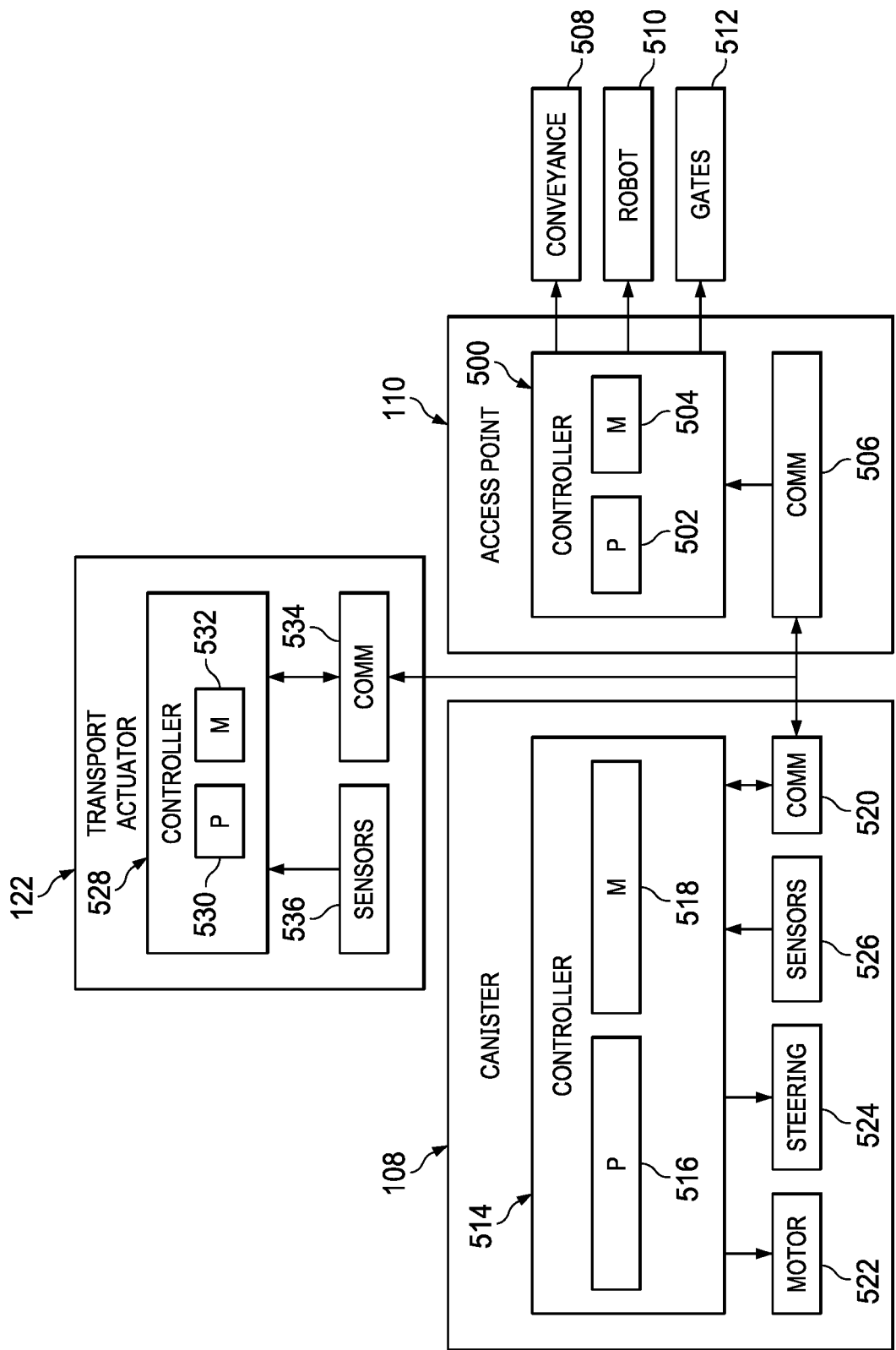
FIG. 5 is a schematic block diagram of control/monitoring components of an integrated transportation system, in accordance with an embodiment of the present disclosure.

FIG. 5 illustrates an example of electronic components that may communicate with each other in portions of the integrated transportation system 100 of FIG. 1. In an embodiment, the access point 110 may include a controller 500 having a processor 502 and a memory 504. The memory 504 stores instructions thereon that, when executed by the processor 502, cause the processor 502 to perform various tasks in accordance with the present disclosure. The access point 110 may include a communication interface 506 configured to communicate with one or more other components such as, for example, the pod 108 or the transportation actuator 122. The communication interface 506 may read a tracking code (e.g., via an RFID reader, a barcode reader, or some other reader) associated with the pod 108 and input the tracking code to the controller 500. When retrieving a pod 108 from a tube to the access point 110, the controller 500 may output control signals to one or more other components at the access point 110 including, but not limited to, a conveyance device 508, a robotic device 510, or gates 512 used to open or close particular access points at the location.

When receiving a new pod 108 into a tube through the access point 110, the communication interface 506 may transmit a notification to the transportation actuator 122 regarding which tube 102 or track to direct the new pod into based on the tracking code.

In an embodiment, the pod 108 may include a controller 514 having a processor 516 and a memory 518. The memory 518 stores instructions thereon that, when executed by the processor 516, cause the processor 516 to perform various tasks in accordance with the present disclosure. The pod 108 may include a communication interface 520 configured to communicate with one or more other components such as, for example, the access point 110 or the transportation actuator 122. The communication interface 520 may transmit tracking information (e.g., via an RFID tag) associated with the pod 108 for detection by the access point 110 and/or the transportation actuator 122. The communication interface 520 may receive information from the access point 110 about a locker, docking station, or other precise location outside of the tube to enter at the access point and input this information to the controller 514. The controller 514 may output control signals to one or more other components on the pod 108 including, but not limited to, an electric motor 522 and/or steering device 524 so that the pod 108 can drive, fly, or swim to a desired location once retrieved at the access point 110. The pod 108 may also include one or more sensors 526, such as a camera (e.g., infrared camera) and/or pressure sensors to assist in steering the pod 108.

In an embodiment, the transportation actuator 122 may include a controller 528 having a processor 530 and a memory 532. The memory 532 stores instructions thereon that, when executed by the processor 530, cause the processor 530 to perform various tasks in accordance with the present disclosure. The transportation actuator 122 may include a communication interface 534 configured to communicate with one or more other components such as, for example, the pod 108 or the access point 110. The communication interface 534 may receive information from the access point 110 about a particular tube or direction in which to propel the pod 108 and input this information to the controller 528. The controller 528 may output control signals to one or more other components (e.g., motor, electromagnetic components, valves, and/or speed control components) of the transportation actuator 122 to direct the pod 108 through a tube. The transportation actuator 122 may also include one or more sensors 536, for example, for detecting a location and/or speed of one or more pods 108 in the tube.

The disclosed systems and methods for transporting items via pods 108 moving through tubes 102 may provide many benefits to modern society and the environment, particularly in light of current challenges due to climate change. In particular, the disclosed systems are immune to severe weather events associated with climate change, including floods, rising sea level, fires, and natural disasters that can block roadways and which under the existing transportation paradigm can reduce access to emergency supplies. The disclosed transportation system may provide a reliable, efficient, and weather-immune method for responding to natural disasters by quickly sending supplies where they are most needed. In terms of mail delivery, the disclosed transportation system may run 24/7 at a low cost and address ongoing labor shortages. The disclosed transportation system may operate with a net zero carbon footprint, while replacing inefficient and pollution-heavy plane/truck transportation systems to potentially reduce the overall amount of carbon emissions. Thus, the systems and methods disclosed herein may deliver goods in a way that is immune to extreme weather events, while also reducing the emissions that would otherwise exacerbate climate challenges. Lastly, due to the large amount of tunneling needed to lay the tubes underground, the disclosed transportation system would create many new jobs during its implementation on a large, national scale.

The disclosure includes other illustrative embodiments, such as the following.

Illustrative Embodiment 1. A system for transporting one or more items, the system including: a transportation tube disposed at least partially underground or at least partially above ground; a transportation pod configured to secure items therein for transport; a transportation actuator configured to propel the transportation pod through the transportation tube, wherein the transportation actuator includes at least one cable configured to interface with the transportation pod, the at least one cable being driven by a motor to move the cable and the transportation pod through the transportation tube; a first access point located proximate a first end of the transportation tube, wherein the first access point includes a first opening configured to allow the transportation pod to be received into or removed from the transportation tube; and a second access point located proximate a second end of the transportation tube, wherein the second access point includes a second opening configured to allow the transportation pod to be received into or removed from the transportation tube.

Illustrative Embodiment 2. The system of Embodiment 1, wherein the at least one cable includes a first portion configured to move the transportation pod in a first direction through the transportation tube, and a second portion of the at least one cable moves in a second direction opposite the first direction as the motor drives the at least one cable.

Illustrative Embodiment 3. The system of Embodiment 2, further including a second transportation tube located between the first access point and the second access point, wherein the second portion of the at least one cable moves through the second transportation tube in the second direction.

Illustrative Embodiment 4. The system of Embodiment 1, wherein the at least one cable includes a series of hooks, locks, connectors for a plate, or other engagement features spaced relatively equidistant from each other and configured to attach to a complementary engagement feature on the transportation pod.

Illustrative Embodiment 5. The system of Embodiment 2, wherein the attachment mechanism is made from the same material as the cable.

Illustrative Embodiment 6. The system of Embodiment 1, wherein the at least one cable extends through the transportation tube at a location toward a bottom portion of the transportation tube.

Illustrative Embodiment 7. The system of Embodiment 1, wherein the at least one cable extends through the transportation tube at a location toward a top portion of the transportation tube.

Illustrative Embodiment 8. A system for transporting one or more items, the system including: a transportation tube disposed at least partially underground or at least partially above ground; a transportation pod configured to secure items therein for transport; a transportation actuator configured to propel the transportation pod through the transportation tube, wherein the transportation actuator includes a track extending through the transportation tube and a cable disposed at least partially inside the track, the cable configured to be coupled to the transportation pod as the transportation pod is propelled along the track; a first access point located proximate a first end of the transportation tube, wherein the first access point includes a first opening configured to allow the transportation pod to be received into or removed from the transportation tube; and a second access point located proximate a second end of the transportation tube, wherein the second access point includes a second opening configured to allow the transportation pod to be received into or removed from the transportation tube.

Illustrative Embodiment 9. The system of Embodiment 8, wherein the cable is configured to propel the transportation pod along the track.

Illustrative Embodiment 10. The system of Embodiment 8, wherein the cable is a chain located at least partially inside the track.

Illustrative Embodiment 11. The system of Embodiment 10, wherein the chain is permanently attached to multiple carriages, each carriage configured to be attached to a transportation pod.

Illustrative Embodiment 12. The system of Embodiment 10, wherein the chain is configured to be removably attached to the transportation pod at any position along the chain.

Illustrative Embodiment 13. The system of Embodiment 10, wherein the fluid medium is water.

Illustrative Embodiment 14. A system for transporting one or more items, the system including: a first transportation tube disposed between a first location and a second location; a second transportation tube disposed between the second location and a third location; wherein the first transportation tube includes a first transportation actuator configured to propel a transportation pod containing items through the first transportation tube between the first location and the second location; wherein the second transportation tube includes a second transportation actuator configured to propel a transportation pod holding items through the second transportation tube between the second location and the third location; a first access point at the first location, the first access point including a first opening configured to allow a transportation pod to be received into or removed from the first transportation tube; a second access point at the second location, the second access point including a second opening configured to allow a transportation pod to be received into or removed from the first transportation tube, the second transportation tube, or both; and a third access point at the third location, the third access point including a third opening configured to allow a transportation pod to be received into or removed from the second transportation tube.

Illustrative Embodiment 15. The system of Embodiment 14, wherein multiple transportation tubes including the first transportation tube are disposed between the first location and the second location, and multiple transportation tubes including the second transportation tube are disposed between the second location and the third location.

Although the present disclosure and its advantages have been described in detail, it should be understood that various changes, substitutions and alterations can be made herein without departing from the scope of the disclosure as defined by the following claims.

What is claimed is:

1. A system for transporting one or more items, the system comprising:
   a transportation tube disposed at least partially underground or at least partially above ground;
   a transportation pod configured to secure items therein for transport;
   a transportation actuator configured to propel the transportation pod through the transportation tube, wherein the transportation actuator comprises two cables configured to interface with the transportation pod, the two cables being driven by a motor to move the cables and the transportation pod through the transportation tube;

a first access point located proximate a first end of the transportation tube, wherein the first access point comprises a first opening configured to allow the transportation pod to be received into or removed from the transportation tube; and a second access point located proximate a second end of the transportation tube, wherein the second access point comprises a second opening configured to allow the transportation pod to be received into or removed from the transportation tube.

2. The system of claim 1, wherein the motor is a bidirectional motor.

3. The system of claim 1, wherein the two cables each comprise a first portion configured to move the transportation pod in a first direction through the transportation tube, and a second portion of each of the two cables moves in a second direction opposite the first direction as the motor drives the two cables.

4. The system of claim 1, wherein the two cables are removably attached to the transportation pod via one or more attachment mechanisms each selected from the group consisting of: a hook, a latch, a carabiner, a lock, a plate that is connected to the two cables and pushes against an end of the transportation pod, a trolley mechanism, a ball/socket connection, or a combination thereof.

5. The system of claim 1, wherein the two cables are located one on either side of the transportation tube and configured to secure the transportation pod on both sides of the transportation pod.

6. The system of claim 1, wherein the system comprises:
two mechanically linked motors used to pull the two cables through the transportation tube;
a controller communicatively coupled to two motors used to pull the two cables through the transportation tube; or
a single motor mechanically coupled to and configured to drive both of the two cables through the transportation tube.

7. The system of claim 1, wherein at least one cable of the two cables comprises an electric line embedded therein for transmitting electricity through the at least one cable.

8. The system of claim 1, wherein the first access point comprises a main line exiting the first end of the transportation tube and a connecting line branching from the main line, the main line including the two cables.

9. The system of claim 8, wherein the two cables of the main line are configured to move at a higher speed than the connecting line.

10. The system of claim 8, wherein the connecting line comprises a brake for reducing the speed of a cable moving along the length of the connecting line away from the main line.

11. The system of claim 8, wherein the connecting line comprises an acceleration mechanism for increasing the speed of a cable moving along the length of the connecting line toward the main line.

12. The system of claim 1, wherein the transportation pod is configured to secure at least one of the following items therein: letter mail, packaged mail, groceries, prepared delivery food, drinking water, household goods, other retail products, pharmaceuticals, vaccines, human organs, agricultural materials, construction materials, supplies for oil and gas operations, oil and gas products, chemicals, waste materials, radioactive materials, and/or recyclables.

13. The system of claim 1, wherein the transportation tube is configured for delivering materials to or from an oil and gas operation site, wherein the transportation pod has a length greater than 18 feet.

14. The system of claim 1, wherein the transportation tube is configured for delivering materials to or from a medical site, wherein the transportation tube, the transportation pod, or both comprise an active heat exchange system for controlling the temperature of the items being transported.

15. The system of claim 1, wherein the transportation tube is configured for delivering toxic materials between two locations, wherein the transportation tube comprises shielding to prevent hazardous material from leaking into or otherwise affecting the environment surrounding the transportation tube.

16. The system of claim 1, wherein the transportation tube is configured for delivering items to or from a military or government site, wherein the transportation, the transportation pod, or both comprise one or more security features.

17. The system of claim 1, wherein the transportation pod comprises one or more sensors and controllable mechanical features that enable the transportation pod to function as a drone when the transportation pod is outside of the transportation tube.

18. The system of claim 1, wherein the transportation pod is temperature controlled.

19. The system of claim 1, further comprising a third access point located proximate the first end of the transportation tube, wherein the third access point comprises a third opening configured to allow the transportation pod to be received into or removed from the transportation tube, the third access point being located vertically above the first access point.

20. The system of claim 1, further comprising at least one maintenance station located between the first end and the second end of the transportation tube, the at least one maintenance station providing access to the inside of the transportation tube.

21. The system of claim 1, further comprising:
a second transportation tube extending between the first access point and the second access point; and
a third transportation tube extending between the first access point and the second access point.

22. A system for transporting one or more items, the system comprising:
a first transportation tube disposed between a first location and a second location;
a second transportation tube disposed between the second location and a third location;
wherein the first transportation tube comprises a first transportation actuator configured to propel a transportation pod containing items through the first transportation tube between the first location and the second location;
wherein the first transportation actuator comprises two cables configured to interface with the transportation pod, the two cables being driven by a motor to move the cables and the transportation pod through the first transportation tube;
wherein the second transportation tube comprises a second transportation actuator configured to propel a transportation pod holding items through the second transportation tube between the second location and the third location;
a first access point at the first location, the first access point comprising a first opening configured to allow a transportation pod to be received into or removed from the first transportation tube;
a second access point at the second location, the second access point comprising a second opening configured to allow a transportation pod to be received into or removed from the first transportation tube, the second transportation tube, or both; and
a third access point at the third location, the third access point comprising a third opening configured to allow a transportation pod to be received into or removed from the second transportation tube.

23. The system of claim 3, further comprising a second transportation tube located between the first access point and the second access point, wherein the second portion of each of the two cables moves through the second transportation tube in the second direction.

24. The system of claim 4, wherein the attachment mechanism is made from the same material as each of the two cables.

25. The system of claim 1, wherein the two cables comprises a series of hooks, locks, connectors for a plate, or other engagement features spaced relatively equidistant from each other and configured to attach to a complementary engagement feature on the transportation pod.

26. The system of claim 1, wherein the transportation actuator is coupled to one or more power generation systems using wind energy, solar energy, and/or natural gas to provide energy for operating the transportation actuator.

27. The system of claim 1, further comprising one or more pumps coupled to the transportation tube and configured to pressurize a fluid medium through the transportation tube such that the pressurized fluid medium propels the transportation pod through the transportation tube.

28. The system of claim 22, wherein multiple transportation tubes including the first transportation tube are disposed between the first location and the second location, and multiple transportation tubes including the second transportation tube are disposed between the second location and the third location.

29. A system for transporting one or more items, the system comprising:
a transportation tube disposed at least partially underground or at least partially above ground;
a transportation pod configured to secure items therein for transport, the transportation pod comprising an undercarriage;
a transportation actuator configured to propel the transportation pod through the transportation tube, wherein the transportation actuator comprises at least one cable configured to interface with the transportation pod, the at least one cable being driven by a motor to move the cable and the transportation pod through the transportation tube;
an elongated rail, rod, or frame extending through the transportation tube to form a track, wherein the cable is disposed inside the elongated rail, rod, or frame the elongated rail, rod or frame forming an enclosure with the undercarriage;
a first access point located proximate a first end of the transportation tube, wherein the first access point comprises a first opening configured to allow the transportation pod to be received into or removed from the transportation tube; and
a second access point located proximate a second end of the transportation tube, wherein the second access point comprises a second opening configured to allow the transportation pod to be received into or removed from the transportation tube.

30. A system for transporting one or more items, the system comprising:
a transportation tube disposed at least partially underground or at least partially above ground;
a transportation pod configured to secure items therein for transport;
a transportation actuator configured to propel the transportation pod through the transportation tube, wherein the transportation actuator comprises at least one cable configured to interface with the transportation pod, the at least one cable being driven by a motor to move the cable and the transportation pod through the transportation tube;
a first access point located proximate a first end of the transportation tube, wherein the first access point comprises a first opening configured to allow the transportation pod to be received into or removed from the transportation tube; and
a second access point located proximate a second end of the transportation tube, wherein the second access point comprises a second opening configured to allow the transportation pod to be received into or removed from the transportation tube;
wherein the first access point comprises a main line exiting the first end of the transportation tube and a connecting line branching from the main line, the main line including the at least one cable;
wherein the connecting line comprises a brake for reducing the speed of a cable moving along the length of the connecting line away from the main line.

* * * * *